Feb. 20, 1962 W. D. DAYTON 3,021,525
MACHINE FOR FORMING AND DRIVING STAPLES
AND FOR BINDING BOOKS THEREBY
Filed Aug. 15, 1960 13 Sheets-Sheet 1

INVENTOR.
WARD D. DAYTON
BY
Paul M. Phillips
ATTORNEY

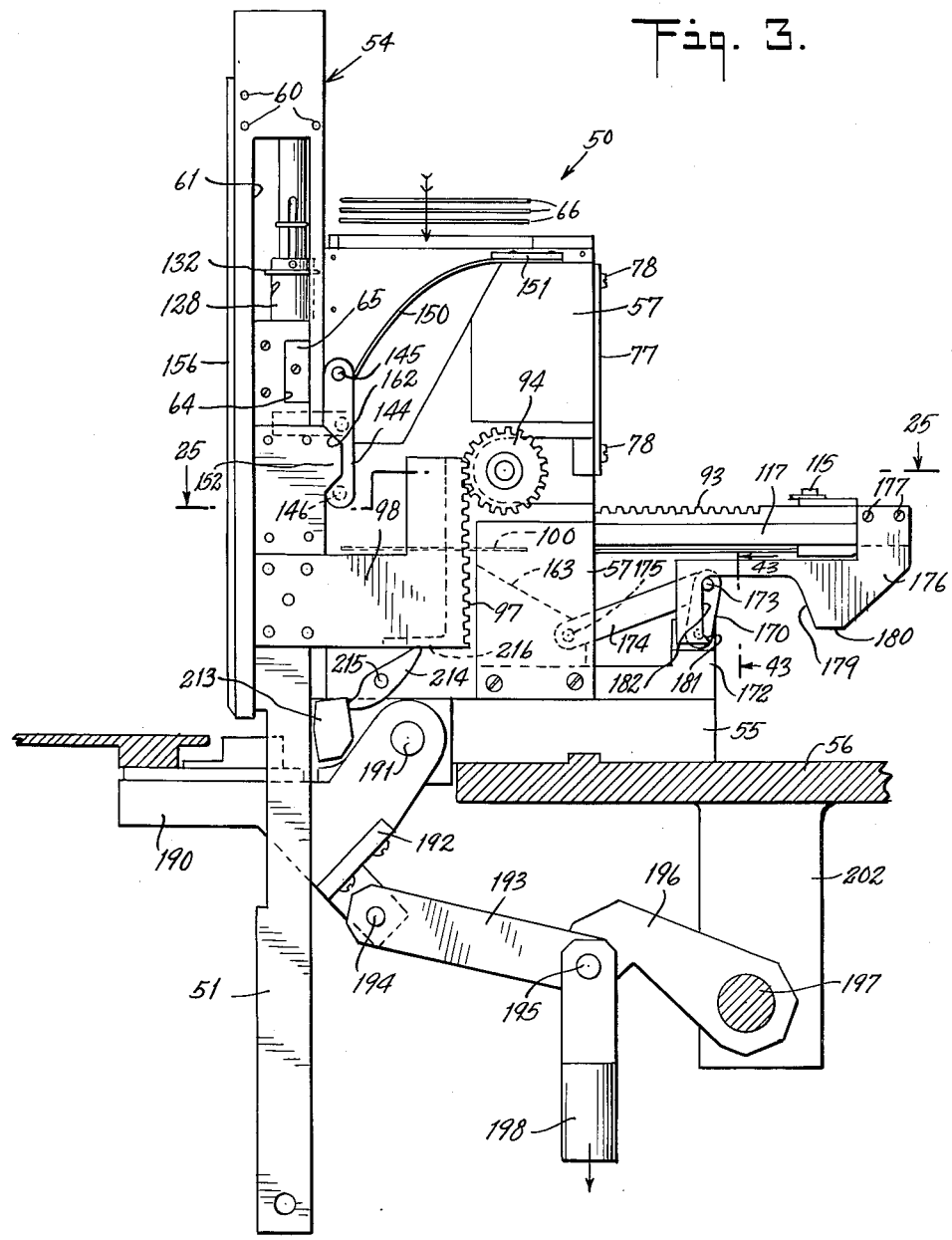

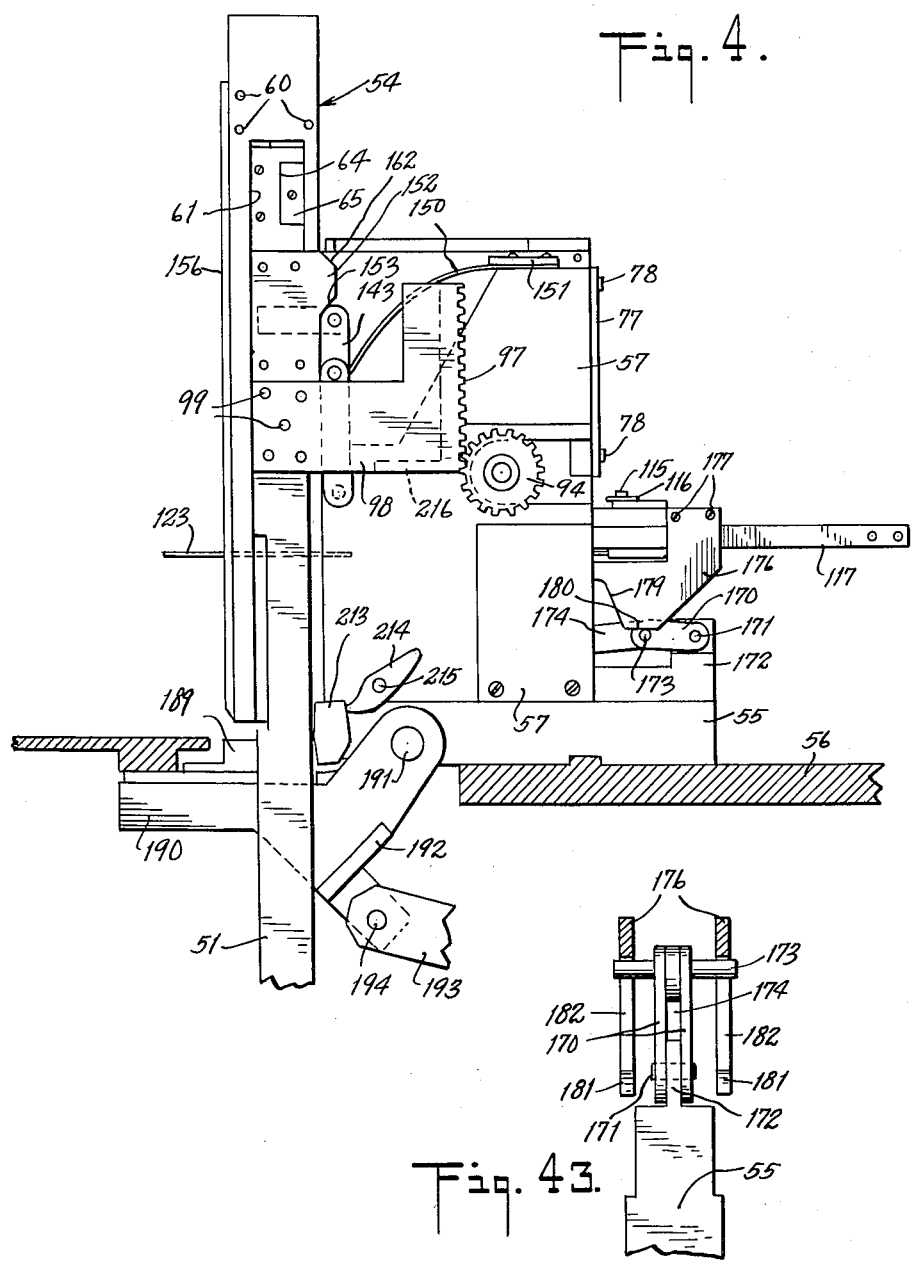

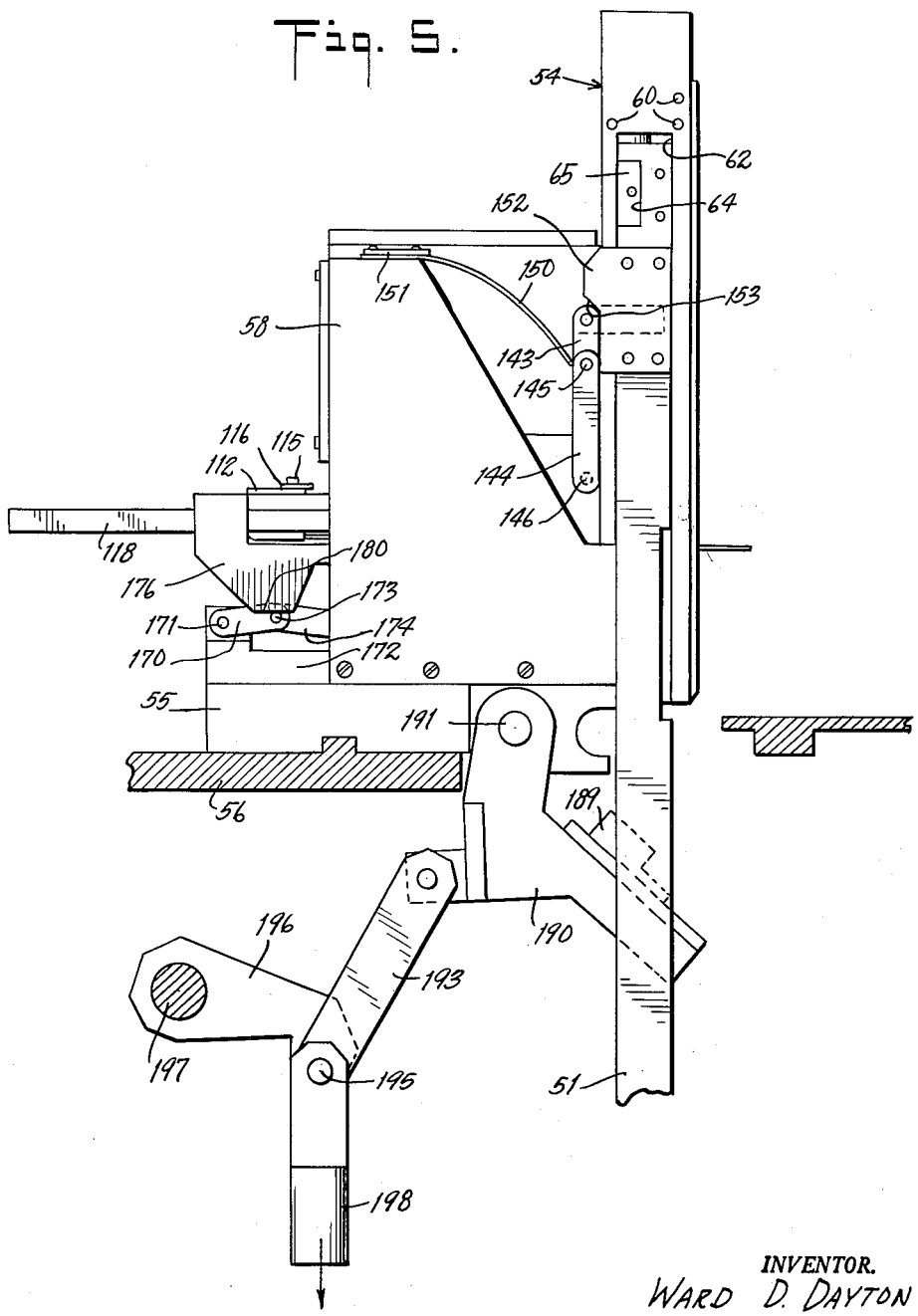

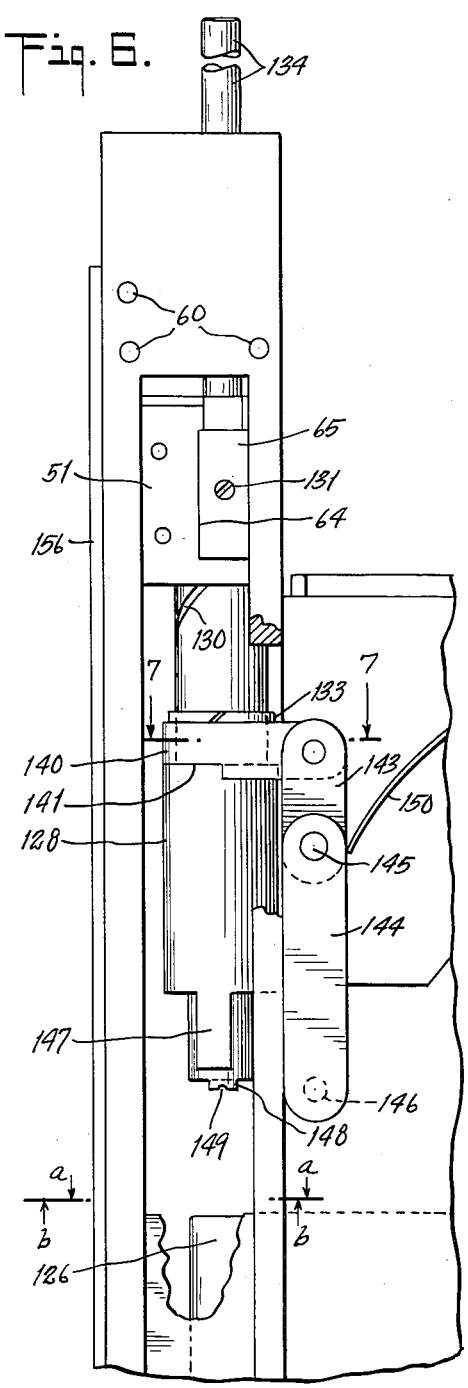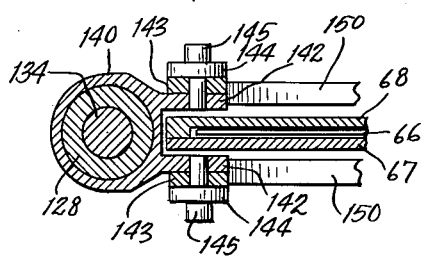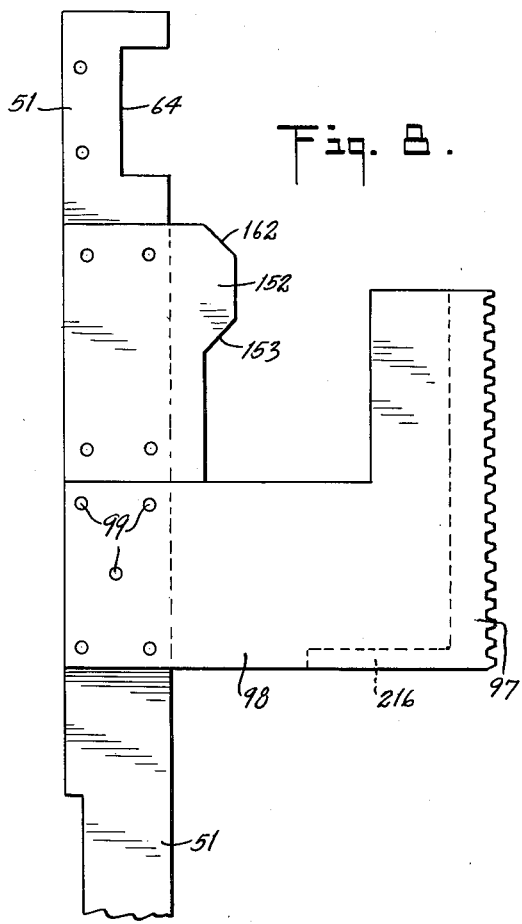

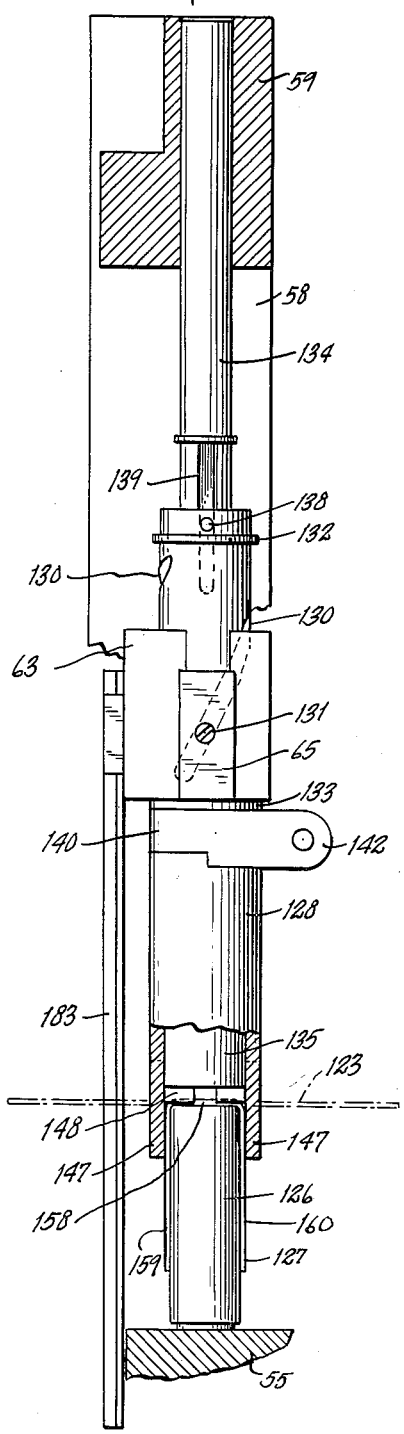
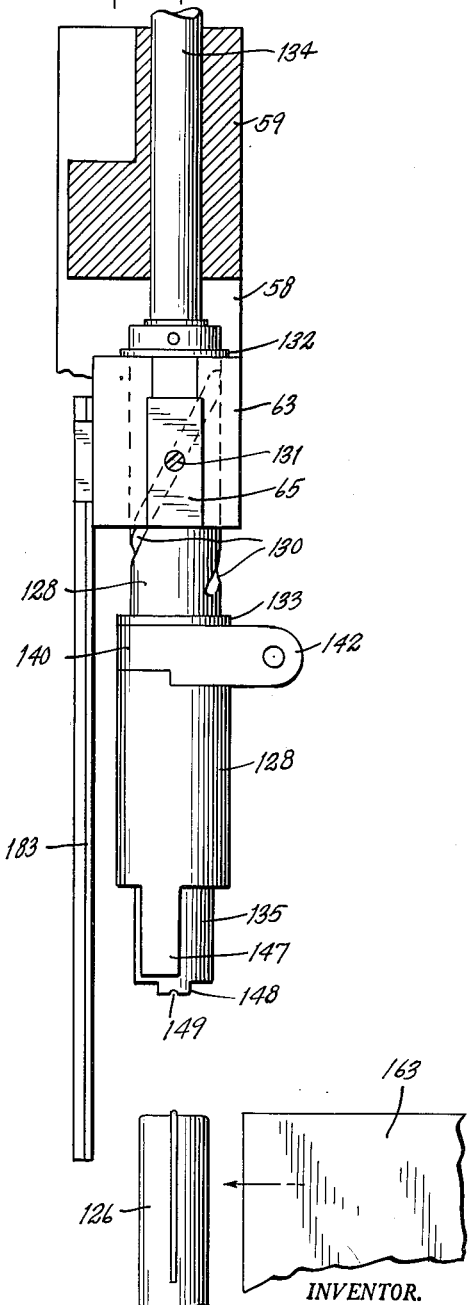

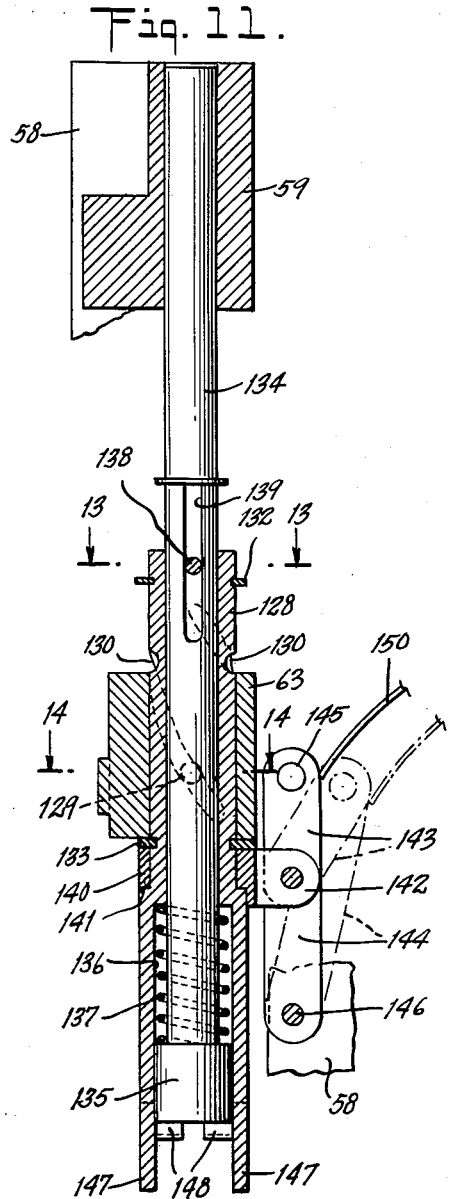
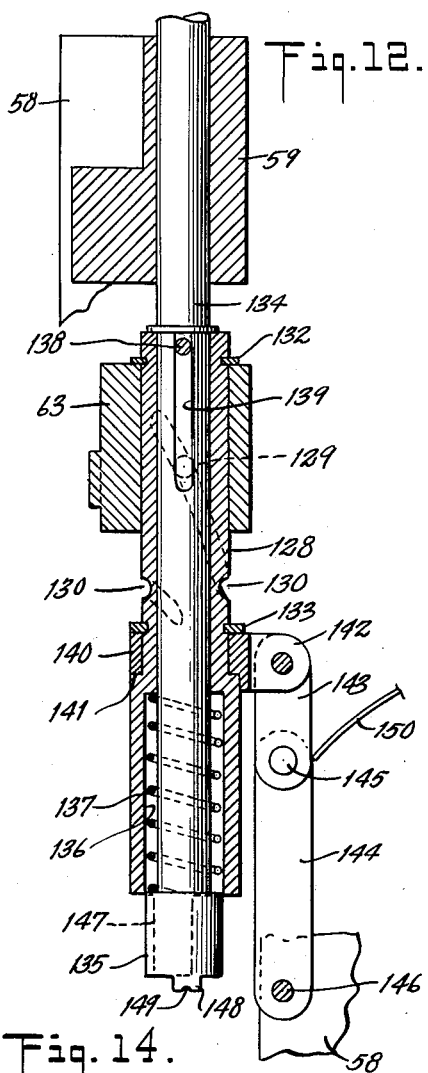
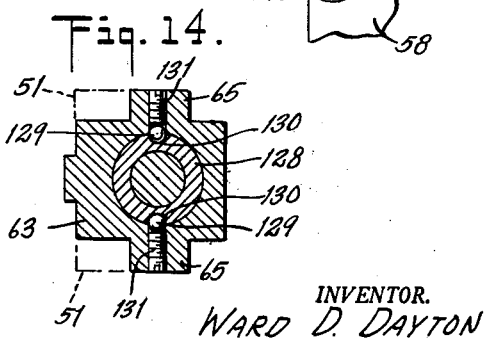

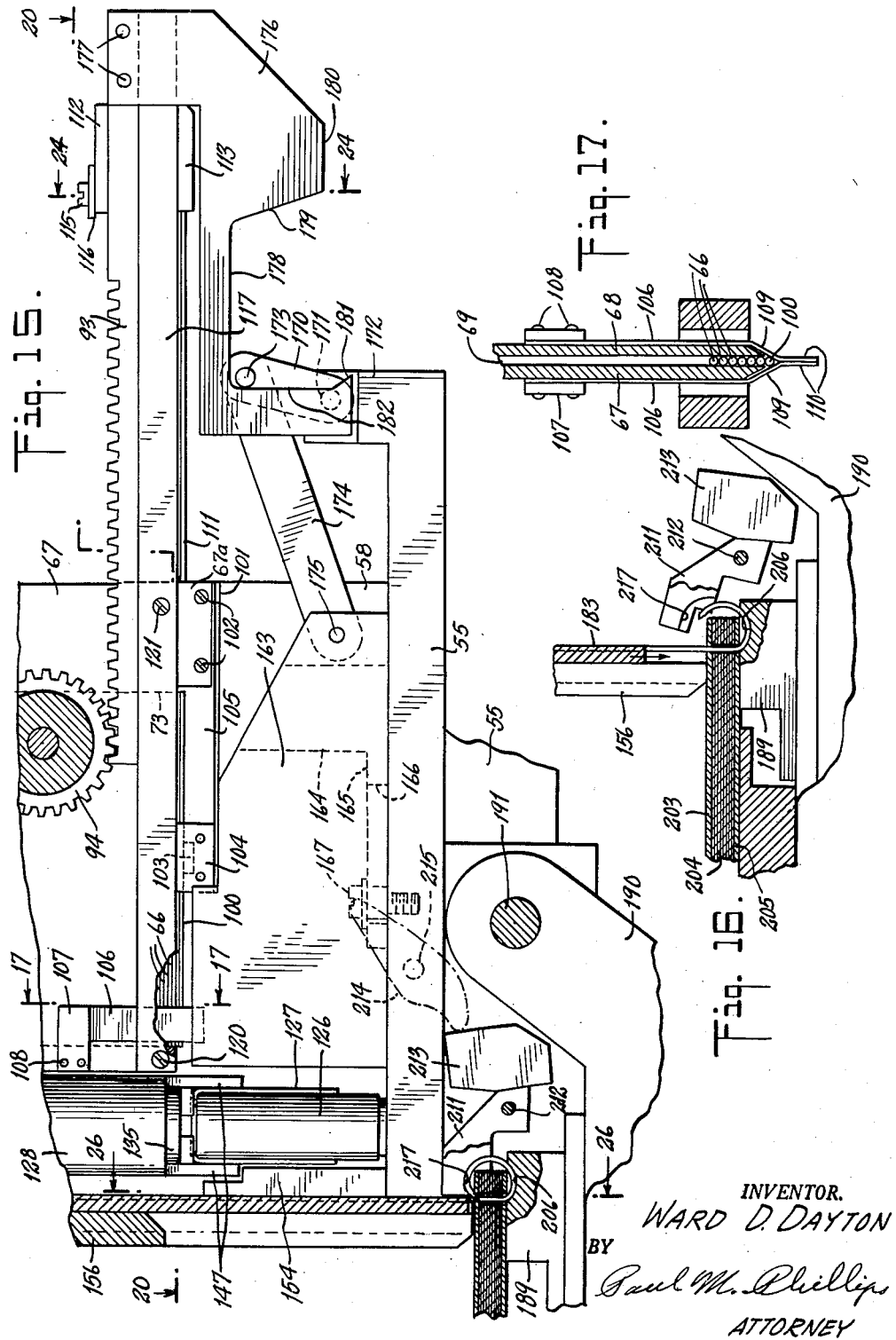

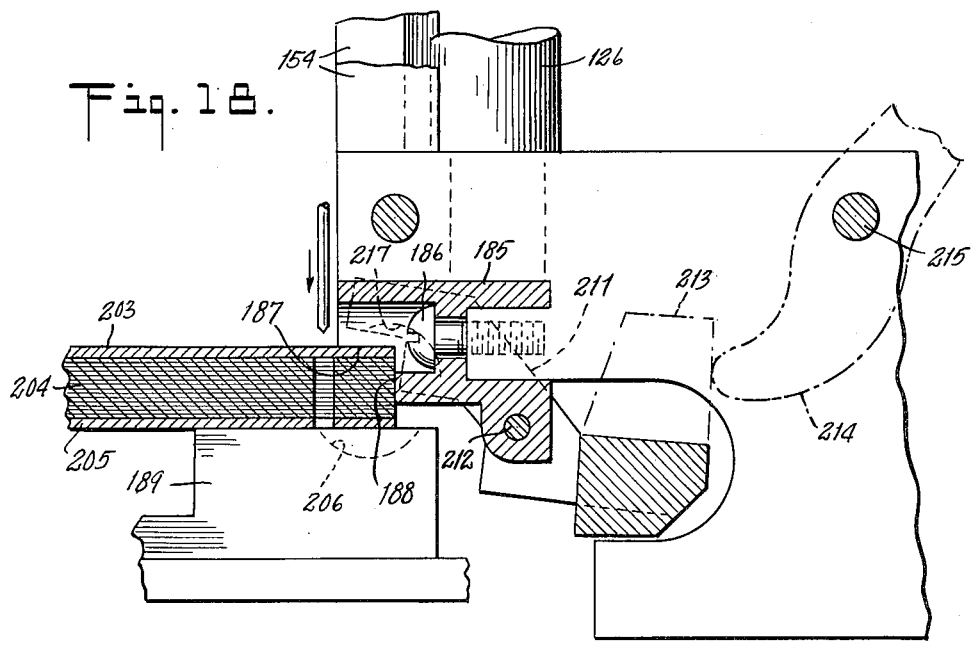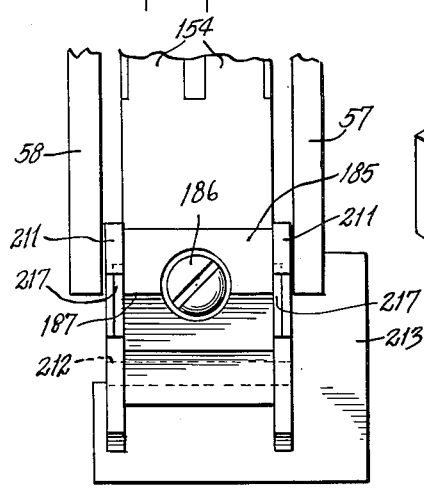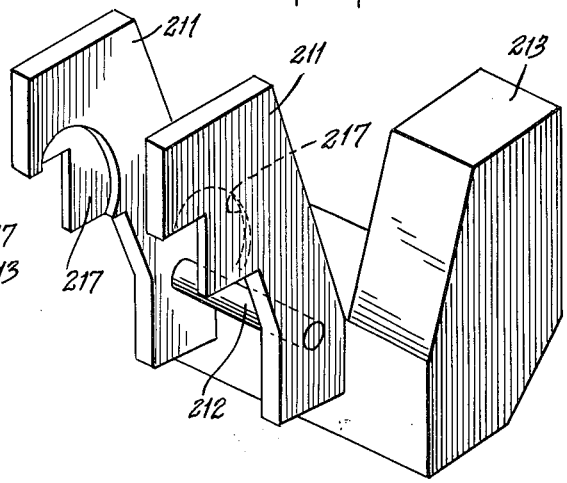

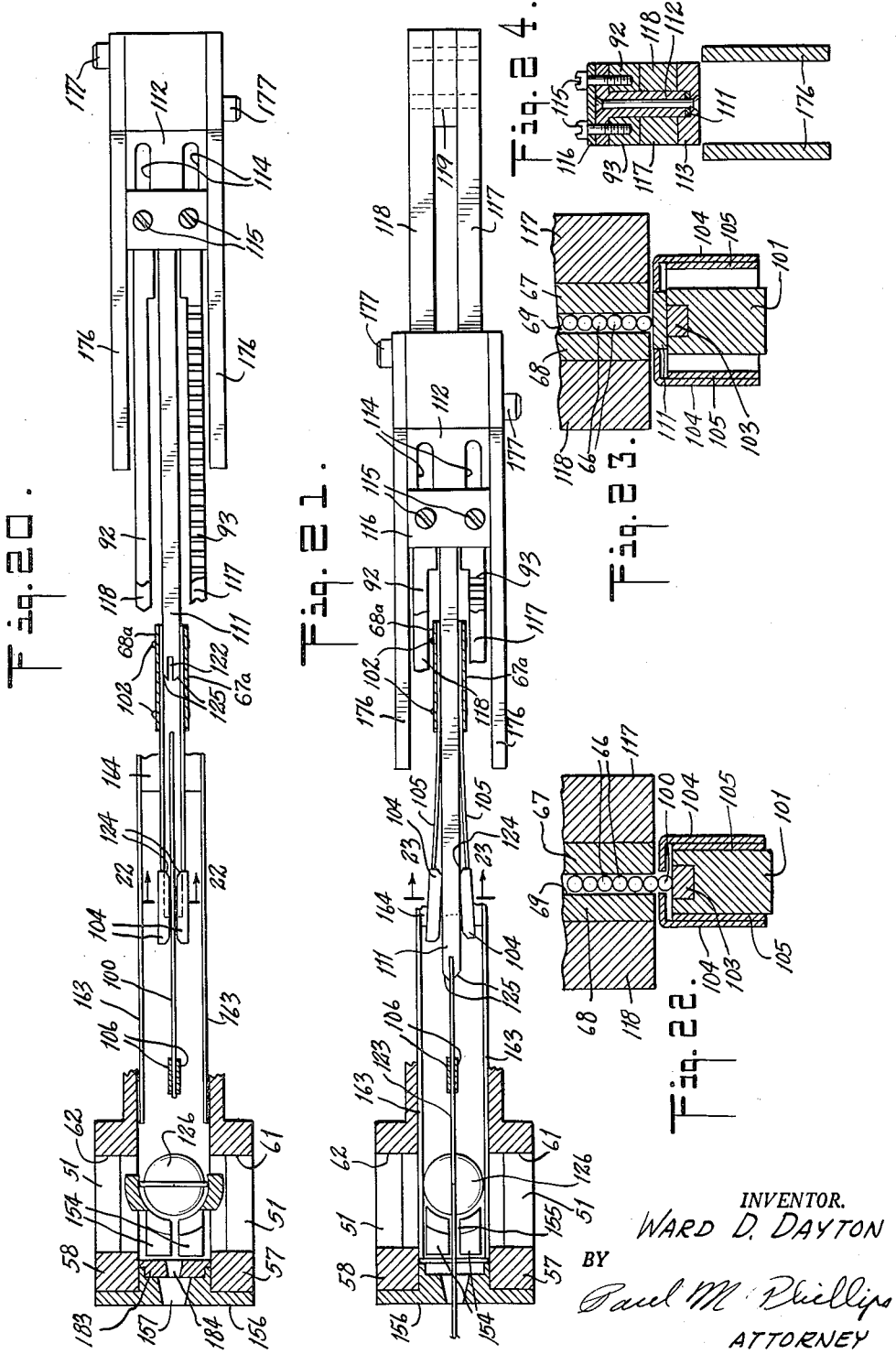

Feb. 20, 1962 W. D. DAYTON 3,021,525
MACHINE FOR FORMING AND DRIVING STAPLES
AND FOR BINDING BOOKS THEREBY
Filed Aug. 15, 1960 13 Sheets-Sheet 11
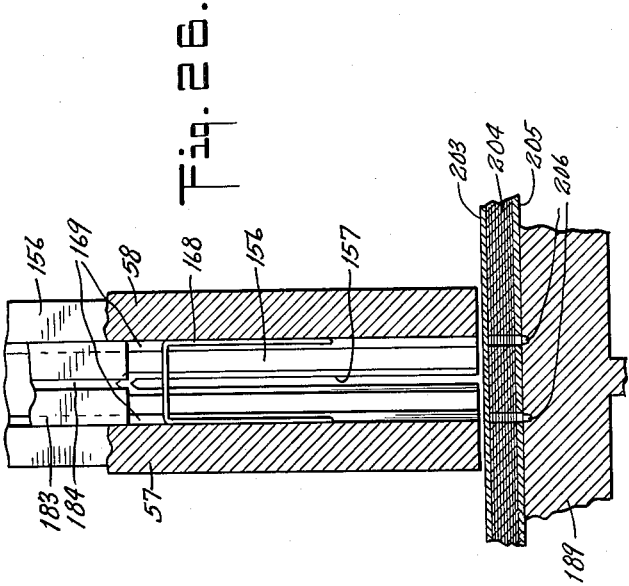
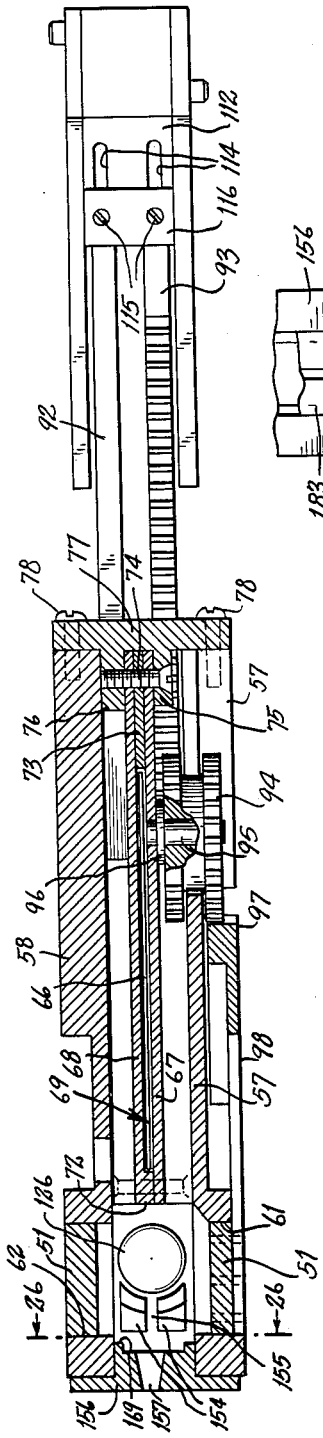
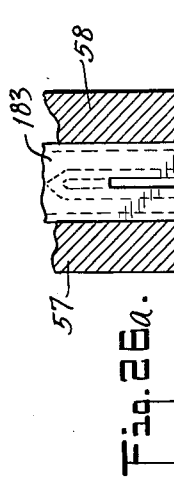
INVENTOR.
WARD D. DAYTON
BY
Paul M. Phillips
ATTORNEY Feb. 20, 1962 W. D. DAYTON 3,021,525
MACHINE FOR FORMING AND DRIVING STAPLES
AND FOR BINDING BOOKS THEREBY
Filed Aug. 15, 1960 13 Sheets-Sheet 12
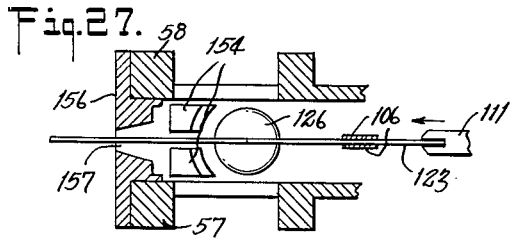
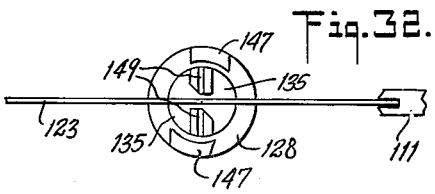
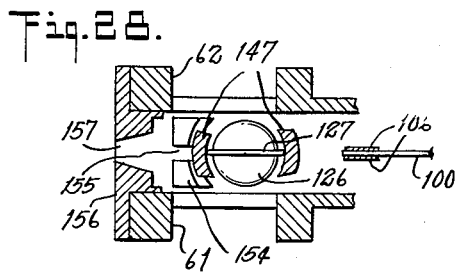
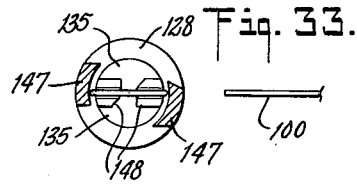
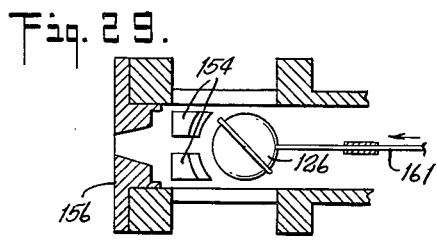
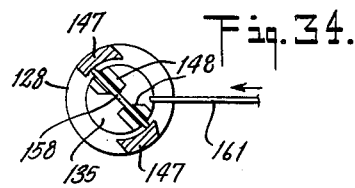
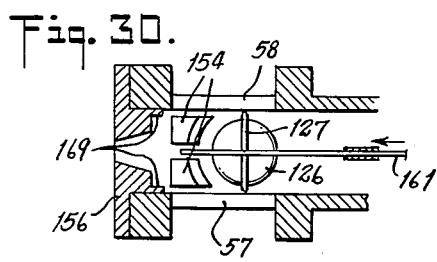
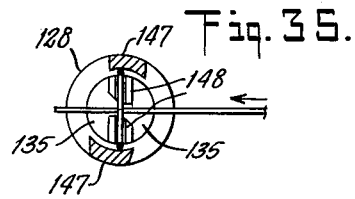
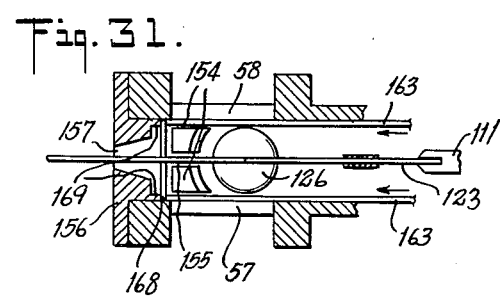
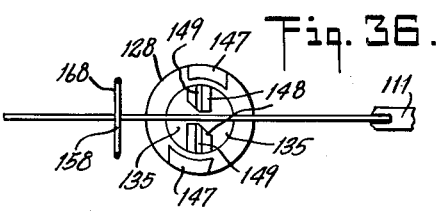
INVENTOR.
WARD D. DAYTON
BY
*David M. Phillips*
ATTORNEY

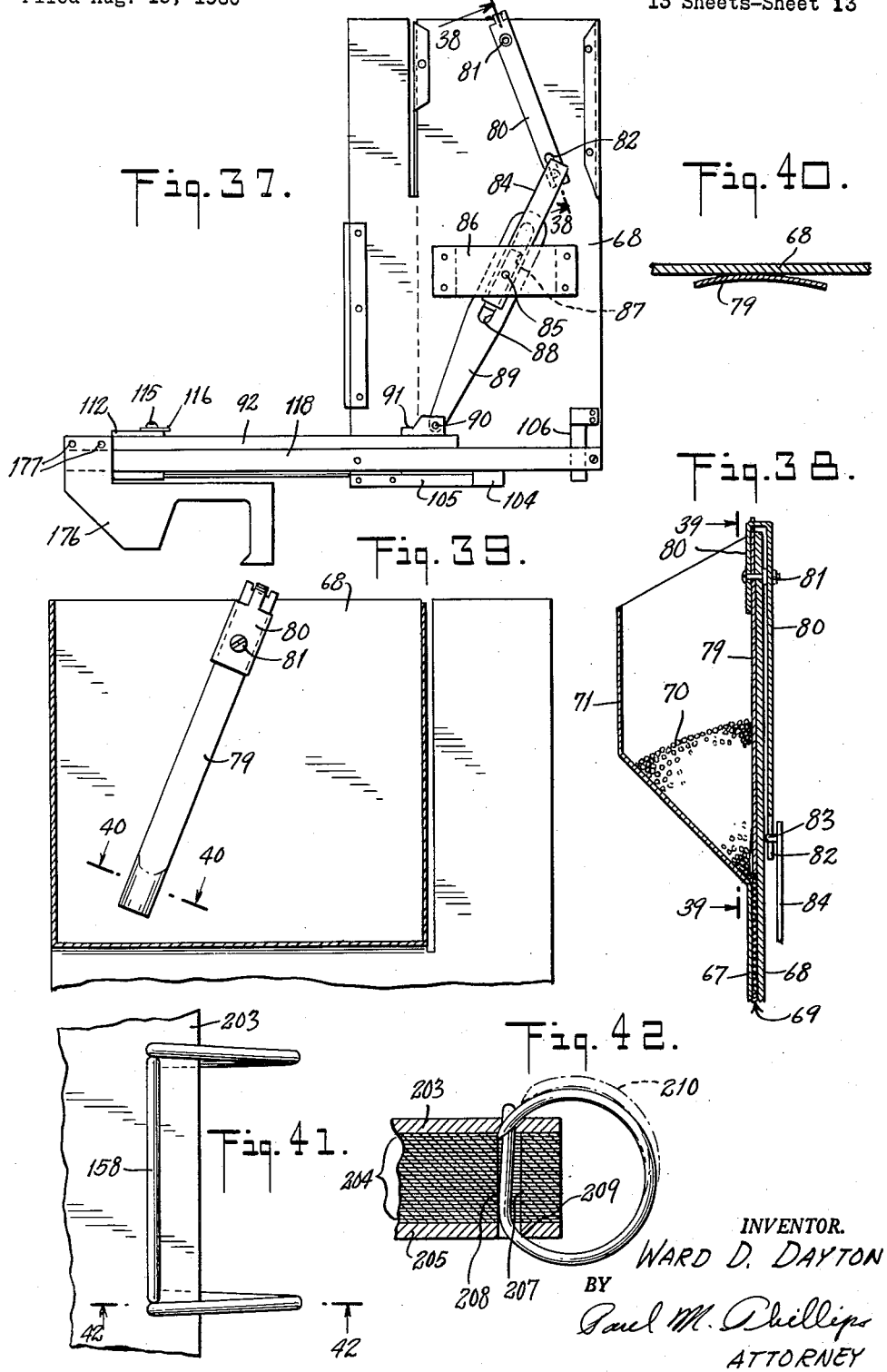

3,021,525
MACHINE FOR FORMING AND DRIVING STAPLES
AND FOR BINDING BOOKS THEREBY
Ward D. Dayton, 9 Buena Vista Way, Morse Lake,
Bloomingdale, N.J.
Filed Aug. 15, 1960, Ser. No. 49,658
31 Claims. (Cl. 1—7)

The present invention comprises a machine for forming and driving staples and more particularly for forming staples having legs of such lengths that when they are driven through the covers and pages of a book, the legs may be curled around into loop form, so as to form a binding, for example, of a blank book of the character usable as a stenographer's notebook. The invention has, however, many broader useful phases than this particular one use, as will be brought out in further detail hereinafter.

Machines have been proposed for forming wire taken from a reel into staples and for driving such staples. In general, however, such machines have used relatively light wire having low strength, usable primarily for binding only a few sheets of paper together. While relatively strong steel wires have been used in making spiral bindings for books or for making other types of relatively long hinge forms extending, for example, the entire length of the hinge portion of the book and having shapes such as to hold the pages together, and while it has been considered feasible heretofore to use relatively strong steel wire provided directly from a reel thereof to make staples which are suitably formed and driven, such staples have usually been spaced very substantial distances apart or have been driven one at a time. As distinguished from this, an important feature of the present invention is the provision of apparatus, which may be supplied with cut lengths of wire, each of a proper length to form a single staple, and wherein the apparatus is so constructed and arranged that a plurality of staple-forming and driving units may be positioned side-by-side and quite close together. In fact, in the preferred form of the invention, hereinafter described the units are of such dimensions that a plurality of staples may be driven simultaneously in a single line parallel to an edge of a book or the like to be stapled and with the distance from a point on one staple to a corresponding point on the next one in their driven positions, substantially less than the length of the wire used to form each of the staples.

It is further an important feature of this invention that this device, and particularly one including a plurality of staple-forming and driving units, shall be so constructed and arranged as to be operated automatically and at relatively high speeds, as contrasted with the requirement of many prior machines heretofore of driving only one staple at a time; or in the case of multi-unit machines, of driving the staples only quite far apart in order that previously available, and relatively bulky apparatus could be used.

It has further been found that many prior art staple driving means were adapted to be supplied with a group of staples, similar to the well-known desk stapling devices; and that the time required for the replacement of groups of staples (limited to perhaps 100 or more or less) at any one time, was excessive with respect to the requirements for automatic operation. In other words, the down time necessitated by the frequent replacement of staples was so great that reasonably full automation was effectively prevented. In contrast with such prior art devices, the present apparatus is arranged to be supplied with straight wires, which may be cut and supplied without any interruption in the operation of the machine and which may be supplied to each unit in such numbers that the down time in the case of the present machine due to feeding requirements is reduced to zero. For this reason, therefore, the present machine is intended both to form and to drive the staple, so as to permit loading with a plurality of straight wires without any interruption in the machine operation.

It has also been found in many instances that it is desirable, if not essential, that the staples shall have the ends of their leg portions tapered or pointed to some extent in order to facilitate the penetration of such leg portions through material with which these staples are to be used. This may be accomplished by cutting wire from a suitable supply thereof into appropriate lengths, each of a proper length to form a single staple, and wherein the ends of the wires may be suitably tapered or pointed as aforesaid by means and/or apparatus forming no part of the present invention.

In order that staples may be driven into work material in a row as close together as it may be desired as aforesaid, it is necessary that there be a separate forming and driving unit for each of the staples in a row to be driven simultaneously. Furthermore, when such units are placed side by side, it is found that the lengths of the cut wires necessary to form staples are greater than the desired distance between staples in a row; so that in order to store such cut wires in each unit, it is necessary practically to store them with the lengths of the stored wires extending in a direction substantially perpendicular to the edge of the material to be stapled, and then to form the staples and move them to the respective staple-driving positions wherein the center portion of each staple will be substantially parallel to such edge of the material. This is provided in the apparatus of the present invention.

A further feature of the present invention, looking toward rapid automatic operation, is that in each of the staple-forming and driving units, the mechanical cycle of operation is such as to be substantially shorter than the entire cycle of forming and driving a staple; so that an overlapping of the forming and driving cycles must be and is provided. From a broad point of view, the present invention comprises the simultaneous forming of one wire into a staple, while the staple just previously formed in the same unit is being driven into the material to be stapled.

Further features of the present invention comprise:

(1) Means for lining up into parallel relationship a plurality of wires which are supplied to a hopper associated with each unit, so that the wires may be supplied from this hopper through a chute in each unit in exact parallel relationship and be fed accurately, one at a time, from the wire-forwarding means;

(2) Means associated with the wire chute in each unit for assuring that each wire, as it emerges from the chute, is held accurately in a wire-forwarding position;

(3) Means for accurately positioning each wire at a wire-forwarding position;

(4) Means for steadying each wire as it is supplied from the wire-forwarding position to the staple-forming position and for preventing any wire ever getting out of accurate control during its course through the entire apparatus;

(5) Means for holding a center portion of each wire accurately at a staple-forming position, while end portions thereof are bent to form a staple;

(6) Means for rotating the staple, so that the central portion thereof, i.e. the portion connecting the legs, is rotated from an initial position substantially perpendicular to an edge to be stapled, to a final position substantially parallel thereto; and (7) Means providing for the supplying of a second wire from its wire-forwarding position to the staple-forming position during the time a first staple formed at the staple-forming position is being transferred from the staple-forming position to a staple-driving position and for providing for non-interference between these wires (or staples) with each other and with other necessary moving parts.

When the present invention is used in the binding of books, certain further features are necessary, which are not required to be used in stapling, considered more broadly. These features include a die means for curling the ends of a staple, as it is being driven, into substantially loop form, following the emergence of the ends completely through the book to be bound; and means for anchoring the ends of the legs of a staple at points adjacent to the junctures between the cross portion thereof and leg portions respectively, so as to assure that the loops formed by the legs of the staple will be complete; and further, in a preferred form of the invention, to anchor such end portions of the staple into the back cover of a book, so as to prevent the rotation of the formed staple with respect to such back cover during the normal use of the book. A book bound in accordance with the specific teachings of the present application is disclosed and claimed in my prior and copending application Serial No. 805,081, filed April 8, 1959.

Other and detailed features of the present invention and certain equivalents of various portions thereof will become apparent to those skilled in the art from the following description of a preferred embodiment of apparatus according to this invention, which is illustrated in the accompanying drawings, in which:

FIG. 3 is a view similar to the upper portion of FIG. 2 and on an enlarged scale, showing a staple-forming and driving means of a single unit, principally in side elevation;

FIG. 4 is a view similar to FIG. 3, but with the parts in different positions;

FIG. 5 is a view similar to FIGS. 3 and 4, but showing the unit substantially in elevation and from the opposite side;

FIG. 6 is a fragmentary view on a further enlarged scale and substantially in elevation, showing the staple-clamping and forming means in an upper position and some of the actuating means therefor;

FIG. 7 is a fragmentary view in horizontal section, taken on the line 7—7 of FIG. 6;

FIG. 8 is a fragmentary detailed view in elevation showing a part of the actuating means including the toggle-breaking cams and a rack for actuating the wire aligning and feeding means;

FIGS. 9 and 10 are fragmentary views principally in side elevation and the parts broken away and in section, showing the staple-forming means and the forming of a staple at the staple-forming position in FIG. 9; and showing the staple rotated as a result of the first portion of its movement from the staple-forming position to the staple-driving position in FIG. 10;

FIG. 11 is a view principally in vertical section illustrating the wire-holding and bending means used in the forming of a staple and showing these means in the position which they occupy at the time the forming of a staple is completed as in FIG. 9;

FIG. 12 is a vertical sectional view similar to that of FIG. 11, but with the staple-forming means in its upper position as in FIG. 10;

FIG. 13 is a view in substantially horizontal section on the line 13—13 of FIG. 11;

FIG. 14 is a view substantially in horizontal section on the line 14—14 of FIG. 11;

FIG. 15 is a fragmentary view with some parts in elevation and others in vertical section, illustrating the lower portion of the wire-feeding chute, the staple-forming parts at position at which the forming of a staple is completed and the staple-driving means at the termination of the forward or driving stroke thereof;

FIG. 16 is a view partly in elevation and partly in vertical section of certain parts shown in FIG. 15, showing particularly the forming of the legs of a staple into loop form during the last portion of the driving thereof at a time shortly before the parts reach the positions shown in FIG. 15;

FIG. 17 is a fragmentary view substantially in vertical section on the line 17—17 of FIG. 15, illustrating certain of the wire-holding and guiding means;

FIG. 18 is a view on a greatly enlarged scale, partly in elevation and partly in vertical section, showing a manner in which a book to be bound is clamped at a position to be stapled and showing the end of a staple in readiness to be driven through the book;

FIG. 19 is a view in elevation, as seen from the left in FIG. 18, illustrating the construction of a part of the means for gripping a book to be bound and also the kicker means for anchoring the ends of the staple loops at the terminus of the staple-driving and loop-forming operation;

FIG. 19a is a view on a still further enlarged scale, and substantially in perspective, showing the movable kicker means used for anchoring the ends of the staple loop into the back cover of a book at the end portion of the staple-driving and loop-forming operation;

FIGS. 20 and 21 are fragmentary views, both principally in plan but with some parts in horizontal section on the line 20—20 of FIG. 15, showing the feeding means in wire-forwarding position in FIG. 20 and with a wire in its staple-forming position in FIG. 21;

FIG. 22 is a fragmentary view in vertical section taken substantially on the line 22—22 of FIG. 20;

FIG. 23 is a view similar to FIG. 22, but taken substantially on the line 23—23 of FIG. 21;

FIG. 24 is a fragmentary view substantially in vertical section on the line 24—24 of FIG. 15;

FIG. 25 is a fragmentary view substantially in horizontal section and with some parts in plan, the section being taken on the line 25—25 of FIG. 3;

Figure 2:
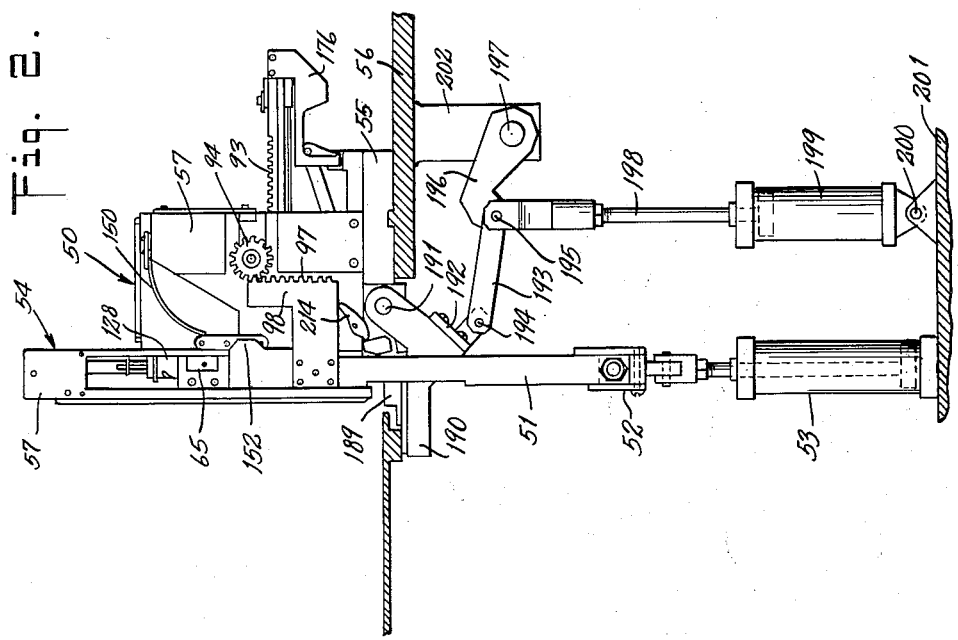
FIG. 2 is a view in side elevation, illustrating an actuating means for one or more units for forming and driving staples and also illustrating a means for clamping material, such as a book to be bound, into a binding position.

FIGS. 26 and 26a are fragmentary views in vertical section both taken on the line 26—26 of FIGS. 15 and 25, showing a staple at the driving position (FIG. 26) and a staple at the fully driven position (FIG. 26a);

FIGS. 27–31 inclusive are a series of horizontal sectional views, all taken substantially on the line a—a of FIG. 6, showing different stages in the making of staples and particularly illustrating the overlapping cycle phase of the invention;

FIGS. 32–36 inclusive are a series of views corresponding respectively to FIGS. 27–31 and all taken as upside down plan views, substantially on the line b—b of FIG. 6 with respect to the staple-forming means, again illustrating various stages in the positioning of wires and the forming of staples therefrom, the actual levels where the views 27–36 are taken being substantially the same except as the views are slightly shifted to include two wires in the course of their formation and movement;

FIG. 37 is a fragmentary view principally in elevation, showing certain of the actuating means for the wire-aligning means, which is used in conjunction with the wire hopper for aligning the wires therein and directing them into the wire chute in proper parallel relation;

FIG. 38 is a fragmentary view in vertical section taken substantially on the line 38—38 of FIG. 37 but with the wire aligning means shifted to a substantially vertical position;

FIG. 39 is a view in section as to the hopper and substantially in elevation as to the wire-aligning means, the section being taken on the line 39—39 of FIG. 38 and with the wire aligning means in a position corresponding to that in FIG. 37;

FIG. 40 is a fragmentary detailed view in section taken substantially on the line 40—40 of line 39;

FIG. 41 is a view on an enlarged scale of one of the staples used in the binding of a book, illustrating the manner in which the ends of the legs of the staple are anchored in the back of the book adjacent to the junctures between the cross member of the staple and the legs thereof, the view being taken of the rear side of the book;

FIG. 42 is a fragmentary sectional view taken substantially on the line 42—42 of FIG. 41; and FIG. 43 (Sheet 3) is a fragmentary detailed view taken substantially in vertical section on the line 43—43 of FIG. 3.

The apparatus shown in the accompanying drawings is particularly designed and intended for the binding of books. It will be understood, however, that by relatively slight changes which will occur to those skilled in the art from the following description, this apparatus or apparatus essentially equivalent thereto could be used more broadly in applying staples to any material or for any purpose. Many features of the present apparatus and many parts thereof are adaptable for general staple forming and/or driving without any change. The illustrated apparatus shown particularly in FIG. 1 includes a plurality of similar units 50, seven such units being shown in this figure. The particular number of units shown in FIG. 1 is in no way essential, but rather the invention may be embodied in any one or more such units, although many features of the invention have particular utility where a plurality of units are used in relatively close side by side relation as in FIG. 1.

In each unit 50 according to the present invention there is a reciprocating actuating means, which is movable back and forth between definite limiting positions, the movement including a forward stroke, in the direction of the material to be stapled, and a return stroke in the reverse direction. While the apparatus shown in the accompanying drawings illustrates each unit 50 in a position to drive staples substantially vertically downwardly, it will be understood that the units could, if desired, be arranged at some other angle; but in any case, would always be arranged to have a reciprocating actuating means here shown generally as a means 51, which is movable in a forward stroke toward the work to be stapled and in a reverse or return stroke. Thus, in the present invention the so-called forward stroke of the reciprocating means 51 is in a vertically downward direction and the reverse or return stroke is vertically upward.

Figure 1:
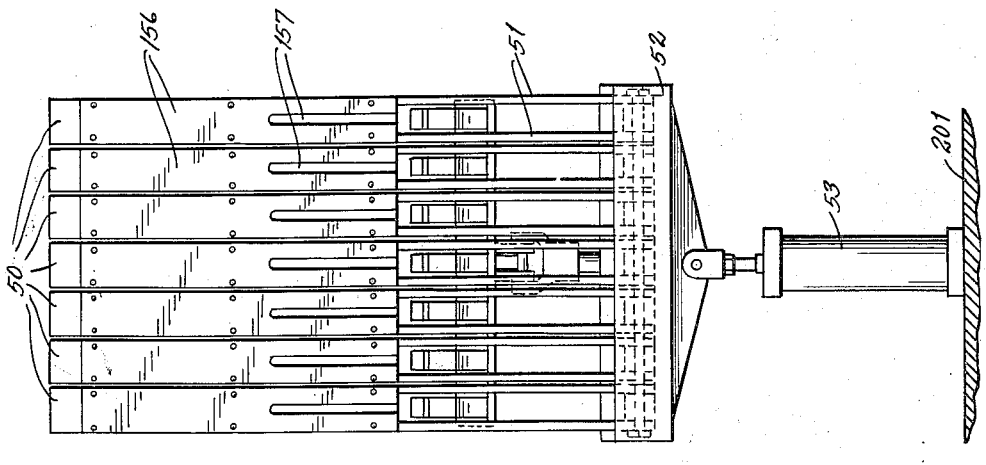
FIG. 1 is a view principally in front elevation of a seven-unit machine, wherein each of the seven similar units embody the invention and wherein all the units are provided with a common actuating means.

As shown, each unit 50 has a pair of downwardly directed members comprising the actuating means 51 and which may be connected, as illustrated in FIGS. 1 and 2, to a crosshead 52, such connection being preferably rigid in character. The crosshead 52 may be reciprocated by any desired mechanism, that shown in the accompanying drawings being a fluid pressure cylinder 53 to the opposite ends of which pressure is supplied and exhausted in a manner well known in the art and under control of any conventional or suitable valve means. It will be understood, of course, that any other prime mover or mechanical actuating means may be used if desired in lieu of the fluid pressure cylinder 53; and further, that such cylinder, if used, may be actuated by either pneumatic or hydraulic pressure as desired or available.

It will further be understood that each of the units 50 may be essentially the same, so that only one need be and will be described in the present case as to its construction and operation.

Each of the units 50 comprises a rigid stationary structure 54 having a base portion 55, which may be suitably secured in a manner, not illustrated, to any appropriate support 56 here shown as a part of a table or stand. The stationary structure 54 is made up of the base portion 55 to which are secured a pair of somewhat similar, but not exactly alike, side members 57 and 58. The side member 57 is located on the side seen in FIGS. 2, 3 and 4; while the member 58 is on the side facing the viewer in FIG. 5. Both side members are illustrated in the section shown in FIG. 25. These side members 57 and 58 are also secured together at the top through the intermediation of a spacer block of brass or the like shown at 59, which is located at the upper end portion of the unit as seen in FIGS. 9–12 and is secured to the side members 57 and 58 by suitable bolts or the like illustrated in FIGS. 3 and 4 at 60.

The upwardly directed portions of the side members 57 and 58, which generally surround the vertically movable actuating means 51, are secured together as aforesaid at the upper ends by the spacing block 59 and further, are each provided with vertical slots, one of which is shown for the member 57 at 61, providing parallel guides for a slide block 63 hereinafter to be described. In a similar manner, the member 58 as seen in FIGS. 5 and 25 is provided with a slot providing a parallel-sided vertical slot 62 for the slide block 63 which is shown in horizontal section in FIG. 14 and in elevation in FIGS. 11 and 12. The block 63 is moved vertically by the actuating means 51, which have recesses 64 formed therein to receive substantially rectangular extension 65 of the block 63, as best seen in FIGS. 2–5, 6, 8 and 14. The actuating means 51 aforesaid and the base structure described thus far form the support and the principal actuating means for substantially the entire wire-feeding and staple-forming and driving means of each unit as hereinafter described in detail with respect to different portions of each of the similar units 50.

*Wire-storing and feeding apparatus*

As generally set forth hereinabove, it is planned in accordance with the present invention that individual straight wires, each of a desired length to form a single staple, shall be cut at some other place and with other apparatus forming per se no part of the present invention; and that these wires shall be supplied to the present invention by being introduced into a hopper and then supplied therefrom to a wire-forwarding position from which they may be advanced individually, one after another, as they are needed in the forming of staples.

The apparatus used for this general purpose is illustrated to some extent in FIGS. 3 and 25 where, for example, in FIG. 3 a plurality of individual wires shown at 66 are introduced vertically downwardly as indicated by an arrow in that figure into a wire chute. It is, however, impractical in an automatic machine to supply wires one at a time to a wire chute in which they are retained in a parallel relationship, one above another as best seen in FIGS. 15, 22 and 23, wherein the wires are also designated 66 as they rest one above another in parallel relation between sides 67 and 68 of the wire chute here generally designated 69.

In the usual case in an automatic machine, a plurality of wires as generally indicated at 70, may be contained within a hopper 71, FIG. 38; and these wires are preferably fed downwardly into the chute 69 between the side members 67 and 68 by means hereinafter to be described.

From the point of view of the stationary structure of the wire-feeding means, the side members 67 and 68 of the wire chute are secured together and with suitable spacing for the wires 66 to pass therebetween as best seen in FIG. 25. In this figure, as seen on the left, the side member 68 has a thickened portion 72, which is suitably secured in the side member 67 in a manner not shown. At the right as seen in FIG. 25, a spacer member 73 is provided between the members 67 and 68, so that in the event that wires of different lengths are to be used for forming staples with different length legs, or even with a different length center portion between the legs, the spacer member 73 may be removed and replaced by a similar spacer of suitable width in a right-to-left direction as seen in FIG. 25. In this figure, one of the wires 66 is also illustrated, the wire being loosely positioned within the slot or chute 69 formed between the side members 67 and 68 and being confined against endwise movement during its passage down the chute by the thickened portion 72 on the left and by the spacer member 73 on the right, both as seen in FIG. 25.

The side members 67 and 68, and the spacer 73 therebetween, are clamped by one or more screws or the like as shown at 74, FIG. 25, between a pair of flanges 75 and 76 extending to the left as seen in FIG. 25 from an end plate 77, by which the entire wire-feeding assembly is carried and supported. The end plate 77 is suitably secured by screws 78 or the like to end portions of the side plates 57 and 58. Thus, if desired, the entire wire feeding assembly may be removed from any unit 50 at any time by merely removing the screws 78 and then removing this assembly as an entirety. This facilitates repair and the replacement of parts of this assembly for servicing without disrupting other parts of the machine, and particularly without interfering with adjacent units 50.

Turning now to FIGS. 37-40 inclusive, there is illustrated a hopper 71 for holding a large number of wires 70. This hopper is open at the top, so that additional wires may be added thereto at any time without interfering with the operation of any part of the machine. It will be understood that a hopper as shown at 71 is preferably provided for each of the units 50.

It has been found that when wires are supplied in considerable numbers and in the ordinary way, as manually, to the hopper 71, some of the wires tend to be in a nonparallel relationship to others. In order that the wires shall be arranged in a strictly parallel relationship so that they may be fed down the wire chute 69 formed as aforesaid between the side members 67 and 68, a means is provided similar in some respects to a windshield wiper in that it oscillates back and forth about a given center. This device is shown as a relatively thin blade 79, which is secured at its upper end in a bracket 80; and both it and the bracket 80 are pivoted for oscillation about a fixed pivot 81 suitably secured in an upward extension of one of the side members 68 as shown.

Means are provided for oscillating the blade 79 about the center of the pivot 81. This could be accomplished from any available source of power or prime mover, but it is conveniently arranged to be actuated by the common actuating means of the entire machine. In this way the oscillation of the blade 80 is synchronized with the operation of other moving parts of the unit 50. As shown, the bracket 80 is extended over the upper edge of the side member 68 (see FIGS. 38 and 39) and extends down on the outside thereof substantially parallel with the blade 79. The lower end of the bracket 80 outside the hopper 71 is bifurcated as indicated at 82, FIGS. 37 and 38 to receive a pin 83 carried by the upper end of a lever 84, which is pivoted for oscillatory movement about a fixed pivot pin 85, secured in the side member 68 of the wire chute and also in a stationary bracket 86 rigid with and secured to the member 68. A slide block 87, seen in FIG. 37 in dotted lines only, may be suitably secured in a manner not illustrated to the oscillating lever 84; or alternatively, the block 87, could be formed as an integral part of the lever 84. This block 87 is received for free sliding movement in a slot 88 formed in an oscillating lever 89, which is pivoted at 90 to a bracket 91, this bracket in turn being secured to a slide bar 92. The slide bar 92 is also illustrated in FIGS. 20, 21, 24 and 25. This bar is an integral part, as a tine, of a fork-shaped member, the other integral tine of the fork being shown at 93 see also FIG. 15 and being formed as a rack with suitable gear teeth. This rack 93 is arranged for horizontal sliding movement as shown in the several figures and is arranged to be actuated by the inner gear member of a double pinion gear 94, FIGS. 3, 4 and 25. This double pinion gear is mounted, as seen best in FIG. 25, on a stationary pivot 95 which is rigid or integral with a flange 96 that may be secured by riveting or otherwise to the side member 67 of the wire chute. The pivot 95 has an axial projection used for centering purposes and extending into a hole suitably formed in the side member 67. An outer gear member of the double pinion gear 94 is arranged to be in mesh with a vertical rack 97, FIGS. 3, 4, 8 and 25, the teeth of which are formed on a thickened portion on the right hand edge part of a bracket 98. The bracket 98 is secured by riveting, or otherwise to the upper end portion of one of the reciprocating actuating means 51 as shown at 99.

Thus, from the point of view of operation, as the means 51 is oscillated in its forward and return movements as aforesaid, the bracket 98 and rack 97, both of which are rigid therewith, are moved vertically as seen in these drawings to rotate the double gear pinion 94. This in turn causes the lateral oscillatory movement of the fork members 92—93 by reason of the meshing of the inner gear pinion with the horizontal rack 93. This in turn (referring now to FIG. 37) causes the portion 92 to oscillate to the right and left, as seen in FIG. 37, which oscillates the lever 89.

In view of the fact that the pivot point between the bracket 91 carried by the member 92 is fixed to that member, and as the pivot point 95 is also fixed, lost motion is taken care of by the sliding movement of the slide block 87 moving in the slot 88. Thus movement of the lever 89 causes the oscillatory movement of the lever 84 about its pivot 85. This in turn transmits oscillatory movement to the lever 80 in view of the pin and slot connection 83, 82; while the member 80 carries the blade 79 rigidly therewith. Thus each time the actuating means 51 moves both up and down as shown herein, there results a complete oscillatory movement of the blade 79 to move to from one end of its path to the other and back.

It has been found that when the lower end of the blade 79 is dish-shaped as shown best in FIG. 40, the optimum results are secured with respect to the aligning of the wires in a truly parallel relationship. Furthermore, as the end of the blade 79 in the lowermost portion of its path extends substantially to the mouth of the narrow portion of the wire chute 69 between the side members 67 and 68, it tends to exert a downward force upon the wires 66 stacked vertically one above the other in this chute and, therefore, tends to cause the lowermost of these wires to move outwardly as far as such movement is permitted at the lower end of the chute.

While it is contemplated that means other than that particularly shown in FIGS. 37-40 inclusive might be used for lining up the wires and urging them downwardly through the wire chute 69 formed between the side members 67 and 68, the means illustrated in these figures have been found highly efficacious in use. Also, from the point of view of apparatus hereinafter to be described, both in wire-feeding and wire-forming, the feeding of the wires individually and by hand as indicated at the upper end portion of FIG. 3 is one of the possibilities, even though it is recognized that this schematic showing is not practical for high-speed automatic operation.

As shown best in FIGS. 22 and 23, the width of the wire chute 69 is so related to the diameter of the wires 66 that the wires must be disposed in and must pass through the chute one substantially vertically above the other. In other words, the chute width is only slightly greater than that of the wires. The use of any wider chute, wherein there is a substantial tendency for one wire to pass another during their movement through the chute, tends to cause a jam in practice.

The next feature of the invention to be considered in detail is the provision of a means for locating the lowermost wire at the bottom of the stack thereof in the chute 69 and at a predetermined position which may be termed a wire-forwarding position. As particularly seen in FIG. 22, the lowermost wire here indicated at 100 is actually below the lower end of the chute per se. It is however, located in its position by a number of elements and means which will now be described.

A means is provided for supporting the lowermost wire at the wire-forwarding position from below. For this purpose, a relatively thick plate 101, FIGS. 22 and 23, is provided, extending from about the right-hand edge of the chute as seen in FIGS. 3, 4 and 15 to a point just to the left of the place where the section lines 22—22 and 23—23 appear on FIGS. 20 and 21 respectively. This plate 101, which is preferably of a non-magnetic material, such as brass, is rigidly secured to thin depending portions as shown at 67a and 68a of the side members 67 and 68 respectively forming the wire chute by suitable screws or the like shown at 102, FIG. 15. In order that the lowermost wire 100 may be held in place by a force in addition to that of gravity working upon the wires thereabove plus the intermittently applied force from the blade 79, a permanent magnet 103 of "Alnico" or the like may be inserted as shown, FIGS. 22 and 23, this magnet cooperating with the steel wires 66 or 100 to hold them down against the upper surface of the plate 101.

In addition to this, means are provided effective on substantially the midportion of each wire when it is at the position of the wire 100 for preventing lateral movement of the wire and keeping it centered above the center portion of the thickness of the plate 101. For this purpose a pair of angle brackets 104 are provided, the inwardly directed portions of which initially serve to position the wire 100 as shown in FIGS. 20 and 22. Each of these brackets 104 also has a depending flange portion secured to the outer or free end of a leaf spring 105, the right hand ends of which springs, as seen in FIG. 15, are secured to the lower depending extensions 67a and 68a of the side members 67 and 68 by the screws 102, and preferably between these side members respectively and the brass plate 101.

An additional means is provided which serves in part at this time for positioning the lowermost wire 100. This means is shown in FIGS. 15 and 17 and also in a general way only in FIGS. 20 and 21, and comprises a pair of spring members 106. At their upper ends, the members 106 are suitably secured by spot welding or otherwise to brackets 107, which in turn are secured as indicated at 108 to the portion of the side members 67 and 68 of the chute 69 at the thickened portion 72 of the latter. The lower ends of the spring members 106 are normally urged together by the resiliency of these springs to the position shown in FIG. 17. The lower ends of these springs are formed as shown in that figure with converging portions 109 and substantially parallel and contiguous portions 110. The lowermost wire is thus positively located at the wire-forwarding position, while still vertically aligned with the other wires 66 in the chute 69 and is located in the V-shaped recess between the converging portions 109 of the spring members 106, near the apex of this V-shaped recess. In this way, the lowermost wire 100 is retained under full control and is further held against inadvertent movement by the magnet 103.

*Means for moving wire from wire-forwarding position to staple-forming position*

Starting with a wire 100 at the wire forwarding position as previously described, the next operation is to move this wire lengthwise to a staple-forming position, while keeping it under adequate control at all times to prevent any free movement of the wire in any undesired direction. For this purpose, a wire ejector blade 111 is provided as shown in FIGS. 15, 20, 21, 22, 23 and 24. This blade is mounted as best seen in FIGS. 15 and 24 by being clamped against the lower end of a T-shaped block 112 by a lower plate 113, which is riveted through the blade 111 to this block as shown in FIG. 24. The upper end portion of the block 112 is provided with a pair of slots 114, FIGS. 20 and 21, through which extend screws 115, these screws also extending through a wear plate 116 and being threaded into portions of the fork member 92—93.

For supporting the structure just described and shown in FIG. 24, there are provided a pair of stationary rails 117 and 118 (see also FIGS. 20 and 21), which are secured together through an intermediate block 119 at their outer ends, at the right as seen in FIG. 21. These rails are secured to and carried by the side members 67 and 68 by means of bolts 120 and 121, FIG. 15. Thus, all these parts are removable as a unit with the wire-feeding assembly by merely removing the screws 78 as previously described.

In view of the fact that the present machine is intended to be adjustable to compensate for a number of different uses and purposes, it is arranged, as previously suggested, for use of wires of different lengths at different times. Thus, as has been explained, the wire chute 69 accommodates different length wires by the substitution of different width spacer members 73, FIG. 25. At the same time, it has been explained that the fork member 92—93 is moved by the up and down movement of the actuating means 51, the movement of the rack 97 being transmitted through the double pinion 94 to the rack 93, so that the movement of the rack 93 will always have the same amplitude. There are no provisions presently contemplated or necessary for varying the amplitude of movement of the actuating means 51 for reasons which will hereinafter appear. It is necessary, however, in order that staples be formed with legs of the same length for any one staple, that the center portion of wires for forming staples be always located above the center of a mandrel hereinafter described, about which the legs are bent during the forming of a staple. For these reasons, therefore, it is necessary that the wires 100 be moved by different amounts in bringing them from their original or wire forwarding position to a staple-forming position. This necessary variation is compensated by having the end of the ejector blade 111 initially positioned at a variable distance from the end of the wire to be engaged thereby as shown in FIG. 20 incident to the varying widths of the spacer members 73. This is accomplished by a longitudinal adjustive positioning of the blade 111 when making staples from different lengths of wire. For this reason, therefore, the block 112, FIG. 24, by which the plate 111 is carried, is arranged for adjustive movement lengthwise of the slots 114 by first loosening the screws 115, making the desired adjustments, and then tightening the screws. This in practice adjusts the difference between the position of the ejector blade 111 at its furthest right-hand position as seen in FIG. 20 and the end of the wire at the position of the wire 100 to be moved thereby. The blade 111 always has a fixed amplitude of movement.

In practical operation, the ejector blade 111 is moved from right to left as seen in FIGS. 20 and 21, so that the left-hand end of this blade, which is bifurcated to a limited extent as shown at 122, embraces the end of a wire being fed endwise from the position of the wire 100, FIG. 20, to the position of the wire 123 in FIG. 21, which is the staple-forming position for the wire. In the course of this movement, the ejector blade 111 first moves so that the bifurcation or slot 122 engages the end of the wire, then the blade and the wire move simultaneously from right to left as seen in FIGS. 20 and 21, with the wire always guided by the springs 106 and being moved forwardly from between the ends of the guides 104 and out of engagement with the magnet 103.

In this connection it is found that whether or not the blade 111 is initially magnetized, it actually picks up enough magnetism from the magnet 103 so that there is a substantial magnetic attraction between the end of this blade and the end of the wire which helps to keep this end of the wire in the slot 122 at the end of the blade during the movement of the blade. However, if it were not for the spring members 106, this magnetic attraction between the blade 111 and the wire would serve to retract the wire when the blade is retracted. For this reason, therefore, the spring members 106 are formed so as accurately to position a portion of the wire between these members and the lower end portion of the thickened part 72 of the side member 68 (FIG. 25).

It is further noted that in the course of this movement, it is necessary for the guide members 104 to be moved out of the way, as the blade 111 must move therebetween as seen in FIGS. 21 and 23. For this reason, the right-hand ends as seen in FIGS. 20 and 21 of the inwardly-directed flanges of the angle brackets 104 are beveled as shown at 124, while the forward end of the ejector blade 111 is similarly beveled, as shown at 125 in this figure, resulting in a camming action serving to move the angle brackets 104 to the position shown in FIG. 21 against the pressure exerted by the springs 105, so as to permit the passage between these brackets 104 of the blade 111.

*Means for bending wire to the form of a staple*

This means, broadly considered, comprises an anvil about which a staple is formed, a means for holding a central portion of a wire atop the anvil at the position of the wire 123, and a means for bending the ends of the wire down while it is so held.

Referring now to FIGS. 6, 9, 10, 15 and 21, an anvil 126 in the form of an inverted cup-shaped member is provided with the open inside portion of the cup-shaped member freely and rotatably embracing a stationary substantially cylindrical stud, which is secured in a vertical axis position to a part of the base 55. The anvil is arranged for free rotation about the vertical axis of the stud and has an upper substantially circular end about which the staples are formed, for example, at the lower portion of FIG. 9 wherein the initial position of a wire 123 is shown in dotted lines and the final position of the formed staple immediately following the forming thereof is shown in full lines at 127 (see also FIG. 15).

The means for engaging a wire at the position of the wire 123 and holding it on to the anvil 126 and also for bending the ends of this wire down to the position of the staple 127 comprise an assembly which is located above and, for the most part, generally in vertical alignment with the anvil 126. This assembly will now be described.

As stated hereinabove, the slide block 63 is arranged for solely vertical movement by having its extensions 65, FIGS. 9, 10 and 14, mounted for solely vertical sliding movement in the vertical slots 61 and 62. This slide block is actuated for vertical reciprocatory movement by being secured rigidly to the upper ends of the actuating means 51 as aforesaid. The block 63 is provided with a central cylindrical bore which is vertically disposed in alignment with the vertical axis of the anvil 126; and in this bore is slidingly and rotatably received a sleeve member 128. The block 63 has a pair of transverse and aligned threaded bores therein, at the inner ends of each of which is arranged a ball-bearing 129, these ball-bearings extending into opposed helical grooves 130 formed in the outside of the sleeve 128, FIGS. 9–12 and 14. The ball-bearings 129 are held in their operative positions by set screws 131 as shown. The outside of the sleeve member 128 is provided as best seen in FIGS. 11 and 12 with upper and lower snap rings 132 and 133 respectively, acting to limit the relative vertical movement between the sleeve member 128 and the slide block 63, each such ring normally extending into an annular groove in the sleeve member 128. Located axially within the sleeve member 128 is a shaft 134 carrying at its lower end a holding ram 135. These parts 134 and 135 may, if desired, be formed integrally. The upper end of the shaft 134 is slidingly and rotatably received within a smooth bore in the spacer block 59 for guiding the movement of the several parts in addition to the guidance provided by the vertical slots 61, 62 which receive the extensions 65 of the slide block 63. The holding ram 135 of the shaft 134 is received in sliding relation in a counterbore 136 in the enlarged diameter lower end portion of the sleeve member 128, FIGS. 11 and 12. A compression spring 137 extends between the inner end of this counterbore and a shoulder at the upper end of the ram 135 and surrounds the shaft 134, thus tending at all times to move the ram 135 downwardly with respect to the sleeve member 128.

Means are provided for preventing relative rotation between the shaft 134 and the sleeve member 128. For this purpose, as seen best in FIGS. 11 and 13, an opposed pair of set screws 138 are threaded through opposite bores in the sleeve 128 and have their inner ends extending into a pair of opposite longitudinal grooves 139 in the shaft 134. Thus the sleeve 128 and the shaft 134 and its holding ram 135 may rotate together about the axis of the shaft 134, which is coincident with the vertical axis of the anvil 126, but there can be no relative rotation between the shaft 134 and the sleeve member 128 about this axis.

Means are also provided for assuring that the rotation of the sleeve 128 and the shaft 134, incident to relative vertical movement between these two parts on the one hand and the slide block 63 on the other, and in accordance with the curvature of the helical grooves 130, occurs only at the desired times and in the desired sequence in the operation of the apparatus. For this purpose a toggle arrangement is provided including a collar 140 extending around the sleeve member 128, as best seen in FIGS. 6, 7, 11 and 12. The collar 140 is supported from below by a shoulder 141 formed at the juncture of the larger-diameter lower portion of the sleeve member 128 and a relatively smaller-diameter upper portion thereof and is prevented from moving upward with respect to the sleeve member 128 by the snap ring 133. The parts are so constructed and arranged that the sleeve member 128 may rotate freely within the collar 140, while relative vertical movement between these two members is prevented as aforesaid. The collar 140 is provided, as best shown in FIG. 7, with a pair of ears 142, preferably integral therewith, to which are respectively pivotally connected upper toggle links 143, the connections being by a pair of pins disposed on an aligned horizontal axis. The lower ends of the upper toggle links 143 are respectively pivotally connected to a pair of lower toggle links 144 by knuckle pins 145, which have aligned axis and which have outwardly-extending portions as shown in FIG. 7. The lower ends of the links 144 are respectively pivoted to the side members 57 and 58 by horizontally aligned fixed pivots 146.

The lower end of the sleeve 128, and particularly of the larger-diameter portion thereof, is formed with depending tongue-like extensions 147 shown best in FIGS. 6, 10 and 32–36. There are two of these extensions 147 arranged oppositely one another and with spaces therebetween, the purpose of which will appear hereinafter in the description of the operation of this structure. The holding ram 135 also has at its lower end a very special configuration which is required for the proper operation of the machine. As shown, it is provided with a pair of similar spaced downwardly extending projections 148, arranged 180° apart on the ram end. These projections are shown in inverted plan view in FIGS. 32–36, and are shown in elevation in FIGS. 6 and 9–12. These lower ends of the projections 148 have two parts of a substantially diametric groove 149 therein.

*Operation of the unit in the forming of a staple*

Starting with the parts in the position shown in FIGS. 6, 10, 12 and 27, and assuming that a first wire only, shown at 123 in FIG. 27, has been placed in the staple-forming position by the means previously described, the actuating means 51 will be at the very topmost end of their stroke. Also, the wire 123 is positioned as shown in inverted plan in FIG. 32 under these circumstances. The lower end of the sleeve member 128, and particularly the depending extensions 147 thereof, and of the ram 135, and particularly the projections 148 thereof, are all substantially above the position of the wire 123.

The first action is the lowering of the actuating means 51. During the start of this lowering movement, the slide block 63 is positively moved downwardly, as this block is fixedly secured to the actuating means 51. The sleeve 128 cannot at this time be moved downwardly, as the toggles, each consisting of the links 143 and 144 are in their extended dead-center positions shown in FIG. 12; and inadvertent buckling of the toggles in this position is prevented at this time by leaf springs 150, one end of each of which is secured as shown in FIG. 3, at 151, to stationary parts of the machine, in this case one of the side members 57 and 58 thereof respectively. Inasmuch as the lower toggle links 144 are secured to fixed pivot points i.e. pins 146, the knuckle pins 145 of the toggles will always be in position to be engaged by the outer ends of the leaf springs 150.

The positive downward movement of the block 63, therefore, must necessarily cause a twisting of the sleeve member 128 and of the ram 135 therein incident to the engagement between the ball-bearings 129 carried by the slide block 63 and the helical grooves 130. In a model of the machine which has successfully been operated, this initial twisting movement occurs during the first inch of downward travel of the slide block 63 and until the block is substantially in engagement with the stop ring 133 in the relative position of these parts shown in FIGS. 9 and 11. The helical grooves 130 are so designed that this twisting movement will give a 90° rotation to the sleeve member 128 and to the ram 135, which must rotate therewith due to the interlocking relation between these parts incident to the set screws 138 in the sleeve member 128 extending into the longitudinal slots 139 in the shaft 134. This also brings the grooves 149 in the lower end of the extensions 148 of the ram, see FIGS. 32 and 33 into vertical alignment with the wire 123 at its staple forming position.

Further downward movement of the sleeve 128 and the ram 135 can be effected only by moving the toggles 143—144 out of their initial extended dead center position. This is accomplished by a pair of cams 152, one of which is suitably secured as by rivets to each of the vertically-extending actuating means 51. Each of these cams has a lower cam surface 153, FIGS. 3–5 and 8 arranged to engage the outwardly extending ends of the knuckle pins 145 substantially at the time that the rotational movement of the sleeve member 128 and the shaft 134 has been completed and the slide block 63 has reached a position in engagement with the stop ring 133. This causes buckling of each toggle linkage and the outward movement of the knuckle pins 145 thereof against the tension of the leaf springs 150. Once these toggles have been buckled to some extent, the further downward movement of the slide block 63 which is secured to the actuating means 51 will cause positive downward movement of the sleeve member 128 and the ram 135 carried thereby due to the engagement between the slide block 63 and the stop ring 133, the toggle buckling to the extent necessary and then folding on itself; so that at the lowermost position of the actuating means 51, the toggle has reached its other extreme dead center position, the springs 150 again causing the knuckle pins to move into alignment with the upper and lower connections of the toggle linkage.

As the parts are moved downwardly, the first engagement thereof with any part with the wire 123, which lays across and slightly above the anvil 126, is the engagement of the groove 149 in the depending portions 148 of the ram with the wire. This forces the wire 123 downwardly against the top of the anvil. This action occurs, however, substantially prior to the complete downward movement of the sleeve member 128 and its associated means. At this time, further movement of the holding ram 135 is prevented by its being in engagement with the wire 123 and the wire being in turn in engagement with the anvil 126. Further movement of the sleeve member 128 is, however, permitted due to the compression of the spring 137 extending between a part of the sleeve member and a part of the ram as shown by a comparison of FIGS. 12 and 11.

During this further movement and after the wire has been accurately located above and held on the anvil, the lower end portions of the depending extensions 147 of the sleeve member 128 engage the wire and wipe the ends of it downwardly into the form of a staple, FIGS. 9, 28 and 33.

As previously stated, up to the time that the wire 123 is bent as just explained, a rear portion of the wire is resiliently held and steadied by the springs 106 which are shown in detail in FIGS. 15 and 17. As the trailing end portion of each wire is moved downwardly by one of the extensions 147 in forming a staple by bending it from a substantially horizontal to a substantial vertical position as aforesaid, this trailing end portion of the wire is forced out from between the substantially parallel end portions 110 of the springs 106 and is guided during this movement by these depending portions 110 of the spring as shown in FIG. 17. This serves to maintain the straight alignment of this leg of the staple.

During this same period, the leading end portion of the wire 123, which is being moved down simultaneously to form the other leg of the staple, is guided to a substantial extent at least by slots in a front cover plate and in a staple driving ram later to be described as well as by upwardly projecting portions 154, FIGS. 20, 21, 25 and 27–31 inclusive, which are formed either integral or rigid with the base portion 55 and which, as shown, have a slot 155 therebetween to permit the downward passage of the end portion of a wire during this staple-forming movement thereof. As generally above referred to, another feature of the device must be considered in connection with this staple-forming operation; that is a front cover plate shown at 156, which is suitably secured to the forward portions of side members 57 and 58 and is provided with a through slot 157 for passage of the forward end of the wire as is required for clearance purposes. This is necessary to enable a wire to be moved to its staple-forming position at 123 (see FIGS. 27 and 31) and also to permit the downward bending movement of the forward end of the wire in forming a staple. The extent of the front cover plates 156 and that of the slots 157 respectively therein is generally shown in FIG. 1 of the drawings.

The parts have now been brought to the lowermost position of the actuating means 51 or the end of the forward stroke thereof and are in the position shown in full lines in FIG. 9 and also as shown in FIGS. 28 and 33. The staple is now completely formed to include a central portion shown at 158 and a pair of similar depending leg portions 159 and 160.

*The operation of moving the formed staple from its forming position to a staple-driving position*

As will be seen from the accompanying drawings, the central portion 158 of the formed staple is still in alignment with the wires which are stored preparatory to the forming of staples therefrom. This alignment in effect is perpendicular to that of the edge of the work to be stapled, which is assumed to extend across a number of the units 50 shown in FIG. 1. Thus it is necessary, in moving the staple to a normal staple-driving position, to rotate it from this perpendicular position to a position in which the central portion 158 thereof is parallel to the edge of material to be stapled and also to move the staple bodily to a staple-driving position, which, in this case, is forwardly in the machine from the staple-forming position, i.e. to the left as seen in FIGS. 2, 3 and 4. These movements are accomplished during the up-stroke of the actuating means 51 and are effected as now described.

As the actuating means 51 start their upward movement, they cause the slide block 63 to move upward in a positive manner. Upward movement of the sleeve member 128 during this initial movement portion is prevented, however, by reason of the toggle linkage aforesaid including links 143 and 144, which is now in its lower dead-center position as shown in FIG. 11. The initial upward movement of the slide block 63 can, therefore, accomplish only one thing, which is to rotate the sleeve member 128, the shaft 134 and the ram 135 carried thereby, without upward movement of any of these parts. Also, due to the fact that there is a substantial downward pressure, caused by the compressive force of spring 137, on the formed staple and on the anvil 126; and as the anvil itself is mounted for free rotation about the same vertical axis as that of the sleeve member 128 and the shaft 134, the first portion of the upward movement of the actuating means 51 causes the simultaneous rotation of all these parts through an angle of 90°, bringing the anvil and the other parts from the position of FIGS. 28 and 33, which correspond to the lowermost position of the actuating means 51, through the position of FIGS. 29 and 34, to the position of FIGS. 30 and 35. This effects a 90° rotation of the formed staple.

However, during this period, the upward movement of the actuating means 51 is also effective, through the racks 97 and 93 and the intermediate double pinion gear 94 to cause a forward movement of a second wire from its position 100 toward the position 123 incident to the forward movement of the wire-ejector blade 111. In order that there be clearance to permit this forward movement, as indicated, for a second wire, numbered 161 in FIGS. 29 and 34, this wire is moved forwardly at a level just slightly above the level of the central portion 158 of the previously formed staple. Furthermore, the depending extensions 147 of the sleeve member 128 are provided with spaces therebetween to permit the through passage of the second wire 161. Also, the lower end portion of the ram, particularly the downwardly extending projections 148 thereof, are shaped as shown and have spaces therebetween which are all carefully calculated to provide clearance of the passage of this second wire 161. FIGS. 29 and 34 show one intermediate position of the parts which, in the machine as actually built, corresponds approximately to the end of the first half inch of the up-stroke of the actuating means 51. FIGS. 30 and 35 show a further position of the parts substantially at the end of the first inch of up-stroke of the particular machine being described, which is substantially at the point when the 90° rotation of the sleeve member 128 and of the shaft 134 have been completed, the slide block 63 has risen with respect to the sleeve member 128 until its upper end is approximately in engagement with the upper snap ring 132, FIG. 12.

As the slide block 63 is moved further upwardly by the actuating means 51, the engagement of this block with the snap ring 132 will cause the positive upward movement of the sleeve member 128. This movement, however, is permitted only by again breaking the toggles made up of links 143 and 144, which is accomplished at this time by the engagement of upper cam surfaces 162 FIGS. 3 and 8 of the same cams 152 with the toggle pins 145, so as again to break the toggle and move it from the full line position in FIG. 11 toward the dotted line position shown in that figure. It has been found, however, that at this time, the spring 137, extending between a shoulder on the ram 135 and an inner shoulder at the end of the counterbore 136 of the sleeve member 128 is exerting a very positive upward force on the sleeve member 128 which would tend to (and in fact did) make this sleeve member jump upwardly if the toggle were merely released or broken without at the same time exerting a real control of its movement. This tendency for the sleeve member 128 to jump upwardly further tends, due to the helical slot connection between the sleeve member and the slide block 63, to twist the sleeve member and the ram 135 back toward their former rotated positions and thus tends to leave the formed staple 127 in a position intermediate that at which it was formed and the 90° rotated position to which it had previously been moved as aforesaid. These undesired actions are prevented, however, by the action of the leaf springs 150, which act to retain the knuckle pins 145 against the cam surfaces 162 during this breaking of the toggle and hence prevent the overthrow or upward jumping of the sleeve member 128 incident to the expansion of the spring 137. This action is quite important, as the absence of it has been found to be substantially fatal to the proper automatic operation of the machine.

As the sleeve member 128 is now positively moved upwardly by the actuating means 51 and the slide block 63 engaging the snap ring 132, the depending extensions 147 move away from contact with the legs 159 and 160 of the formed staple. At this time, however, these legs are located in relatively narrow spaces between the sides of the anvil 126 and the insides of the side members 57, 58. This is shown for the position of the first staple 127 in FIG. 30, it being understood that the side members 57 and 58 are solid at this lower area opposite the legs of the staple and below the bottom ends of the slots 61, 62 therein. The staple is thus frictionally held in this position to a sufficient extent to prevent its inadvertent movement at this time. However, as the depending extensions 147, which bent the wire into staple form, move out of contact with the staple, and until they have moved substantially out of such contact, the ram 135 is still in position holding the central portion 158 of the formed staple against the anvil 126 due to the continued expansion of the spring 137. Further upward movement of the sleeve member 128 and of the ram takes both completely out of contact with the formed staple and with the second wire 161, which at this time has been moved toward staple-forming position 123 by the further upward movement of the actuating means 51 acting through the wire forwarding means including the ejector blade 111 as aforesaid.

During this further upward movement, it is necessary that the formed staple shall be moved bodily from its position over the anvil to a staple-driving position. The apparatus for accomplishing this result will now be described.

Referring principally to FIG. 15, there are provided a pair of pusher blades 163, portions of which are also shown in FIGS. 20, 21 and 31. These pusher blades, which are similar in form and have the shape best shown in FIG. 15, are disposed in substantially vertical positions and parallel to each other. They are fixedly mounted to a central block shown in FIG. 15 in dotted lines only at 164, this block having a forward extension 165 and resting upon a horizontal flat surface portion of the base 55. The forward extension 165 has a slot 166 therein through which extends a shouldered screw 167 threaded into the base 55 and arranged to permit translatory sliding movement only of the block 164 and the pusher blades 163. These blades are also confined between and are in sliding contact with the insides of the side members 57 and 58 in a manner best illustrated in FIGS. 20 and 21. The left-hand ends of the pusher blades 163 as seen in FIGS. 20 and 21 are vertical and are arranged to engage the leg portions 159 and 160 of the staple at the position thereof shown in FIGS. 30 and 31 as hereinafter set forth.

Means are provided for moving the pusher blades 163 in timed relation with the remainder of the operations, so as to move each staple successively from the position of the staple 127 shown in FIG. 30 to the staple-driving position which is that shown for a staple 168 in FIGS. 26, 31 and 36, wherein the staple legs are moved against inwardly-extending flange portions 169 of the front cover plate 156.

The operating means for the pusher blades 163, as seen in FIGS. 3, 15 and 43, comprise a toggle linkage and cam actuating means. The toggle linkage comprises a pair of links 170 pivoted on a fixed pivot 171 to an upwardly extending portion 172 of the base 55, FIGS. 3, 15 and 43. Connected to the links 170 at a knuckle pin 173 is a link 174, the opposite end of which is pivoted at 175 to the block 164.

The means for actuating this toggle to move the pusher blades 163 comprise a pair of cams 176, which are rigidly carried by and movable with the fork member 92—93, being secured thereto by suitable screws as shown at 177, FIG. 15, one preferably being inserted from each direction respectively and threading into the cam members 176 on the opposite side. Alternatively, any means for mounting the cam members 176 suitably rigid with the fork member 92—93 is considered within the scope of this invention.

As previously stated, the member 92—93 moves from right to left as seen in FIG. 15 on the upward movement of the actuating means 151, so that the ejector blade 111 carried thereby will move a wire to a staple-forming position during this upward or return movement of the actuating means. Also as previously set out, it is necessary that the first portion of this upward movement be devoted to the rotation of the formed staple from its forming position to a position at right angles thereto and then to the movement of the sleeve member 128 and the ram 135 upwardly out of contact with this formed staple, all before the staple may be moved from its position above the anvil 126 to its staple-driving position 168. For this reason, therefore, the cams 176 are arranged with large cut-out portions 178, so that there will be no engagement between any part of these cams and the knuckle pins 173 of the toggle including links 170 and 174 until the proper time in the cycle. When this time comes, cam surfaces 179 of each of the cams 176 engage the ends of the knuckle pin 173 and move this pin and the toggle links connected thereto so as to move the pusher blades 163 forwardly from the position of the parts shown in FIGS. 15 and 20 to the position of the parts shown in FIGS. 4, 21 and 31. At this time, the toggle is substantially straightened to an almost, if not complete, dead-center position (see FIG. 4) and is held in this position by a lower cam surface 180 of each of the cams 176. This is the position of the parts at the uppermost end of the stroke of the actuating means or the end of the return stroke thereof as it is sometimes called.

During the next forward stroke of the actuating means, it is necessary that the pusher blades 163 be retracted; and for this reason, an arrangement is made for retracting these means incident to the downward movement of the actuating means 51 and particularly the movement from left to right of the fork member 92—93 and of the cam member 176 carried thereby, as seen in FIGS. 15, 20 and 21. However, it is desired that the blades 163 be retained in supporting contact with the legs of the staple during a substantial portion of the driving thereof, rather than being moved out of contact immediately upon the initiation of the staple-driving action. For this reason, therefore, the cams 176 are so formed as to release the knuckle pins 173 once the cam surfaces 180 have moved out of contact therewith, but not positively to move the toggle, comprising the links 170 and 174, until the staple has been driven to a substantial extent, and then in a manner and by means hereinafter set forth. At the proper time in the cycle, however, the toggle is first positively moved out of its dead center position by bringing into contact with the extended ends of the knuckle pin 173 inclined cam surfaces 181 formed on the ends of downwardly extending portions of the cams 176 spaced a substantial distance away from the cam surfaces 179 and 180. Following the breaking of the toggle, the knuckle pins 173 are moved upwardly and toward their rearmost position shown in FIG. 15 by engagement with substantially vertical cam surfaces 182 of the members, the ends of which carry the cam surfaces 181.

*Staple-driving means and operation thereof*

The staple-driving means in accordance with the present invention comprises a ram blade shown at 183, FIGS. 9 and 10, this ram blade being arranged to be driven by the primary actuating means 51, and particularly by the interengagement of an upper portion of this blade with a part of the slide block 63. This interengagement is not illustrated in detail, but may take any desired form so long as the blade is positively moved in each direction as the block 63 moves up and down; while a slight amount of relative movement is preferably permitted to compensate for proper alignment incident slight irregularities in the manufacture of the machine. In cross-section, the blade 183 is shown best in FIG. 20, the blade seating in a reentrant portion in the rear of the front cover plate 156 as shown, and having a portion arranged to engage substantially the entire width of the central portion 158 of the staple being driven. The blade 183 must, however, be provided with a longitudinal slot at its center part as shown at 184 in order to provide clearance for the through passage of a next wire being fed prior to the driving of the staple just previously formed. This requirement is best illustrated in FIG. 31 where a staple in driving position is shown at 168 and the wire for forming the next staple is shown at 123, the wire 123 thus passing completely across and above the central portion of the staple 168 at the driving position. It will be understood, that in order that the driving ram 183 shall drive the staple 168 from its driving position, shown for this staple in FIG. 26, to the driven position thereof shown in FIG. 26a, it will be necessary that the slot 184 shall straddle the wire next to be formed into a staple.

It is further noted that during a substantial portion of the downward movement of the staple during the driving thereof, it is steadied by the proximity against the legs thereof of the straight forward surfaces of the pusher blades 163 as hereinabove set forth; while at the same time the staple rests against the inner or rear edge portions of the flange portions 169 of the front cover plate 156 and is also enclosed between parts of the side members 57 and 58. The staple is thus controlled and accurately guided throughout its course and is prevented to a substantial extent from buckling during the driving operation as each leg is positively prevented from lateral movement in three directions.

The apparatus thus far described is adequate for many stapling operations, except that some means should be provided for holding the work to be stapled, but from the point of view of the broader phases of the invention, any suitable means for holding and steadying the work to be stapled may be used, including those which are conventional and well known to those skilled in the art.

In the event that it be desired to bend the legs of the staples over in a conventional manner, for example, either inwardly or outwardly as is commonly done in conjunction with desk stapling devices, for example, any suitable support and die means such as those conventionally used in desk-stapling devices may be employed and suitably supported with respect to the support 55 with the apparatus of the invention thus far particularly described used therewith. It is contemplated that this equipment will have substantial utility in connection with general staple-forming and driving operations wholly apart from its particular utility in connection with the binding of books and the like, which will presently be described.

*Book clamping means for book-binding use of the apparatus*

In order that the device of the present invention as hereinabove described may be used in driving staples, for example, to bind books as set forth in my copending application Serial No. 805,081, filed April 8, 1959, and as illustrated, for example, in FIGS. 41 and 42 of the present application, it is necessary that the books to be stapled be suitably supported and securely clamped in a predetermined position with respect to the staple-driving means. Any general supporting means at an appropriate elevation with respect to the base may be employed as a general support as shown in FIGS. 2–4. Further the base 55 may be suitably formed in its forward end portion with a proper abutment means for locating the edge of the book along which the row of staples is to be placed, sometimes called the binding edge of the book; or a separate means such as a block 185, FIGS. 18 and 19, may be used with the block suitably securely attached to the base 55 in a predetermined position. This block 185 has a width in the direction of the center portion of the staple approximately equal to the overall width of the staple as formed i.e. to the length of the central portion 158 thereof. The block 185 may be attached to the base 55 in any suitable manner, for example, by a screw shown at 186, FIG. 18. This block has a substantially rectangular cutout portion including a substantially horizontal surface 187 and a substantially vertical surface 188, the binding edge of the book to be bound being placed in any suitable manner in the recess formed by the surfaces 187 and 188 and against both surfaces.

In addition to the above, the side members 57 and 58 have portions extending down to and lying in the same horizontal plane as the surface 187, so as to assist in providing an abutment against which the books are clamped during the stapling thereof. The lower end of the front cover plate 156 also extends down to this same plane and serves in part to assist as a stationary upper abutment for a book during the stapling thereof.

The book is clamped between these stationary members just described which abut the book on the upper side and the upper surface of a block 189, which also serves as the curling die for the legs of the staples as hereinafter set forth.

Means are provided for moving the block 189 to and from its operative position, which is shown in FIGS. 15 and 16. In the present instance, these means move the block 189 in an arcuate path; although the arcuate character of this path is not essential to the invention, and it could as well be moved vertically. As shown, however, and referring particularly to FIGS. 2, 3, 4, 5 and 16, the block 189 is rigidly mounted on a supporting member 190, which is pivoted to the base 55 at 191.

The supporting members 190 of each of the plurality of units 50 shown in FIG. 1 may be interconnected by a common cross member 192 suitably secured to each of the members 190 and arranged to be moved a suitable operating means, one form of which comprises a toggle including a link 193, which is pivotally connected to the transverse member 192 at a pivot 194 and is connected at 195, which is the knuckle point of the toggle, both to a link 196 swingable about a fixed pivot 197 and to the upper end of a piston rod 198 of a fluid pressure cylinder 199. The cylinder 199 is mounted for slight swinging movement about a pivot 200 with respect to a fixed base 201. The pivot 197 is suitably mounted in a bracket 202 rigidly connected to the stationary support 56 or some other stationary part. Any suitable and/or conventional means (not shown) may be provided for supplying fluid pressure to and exhausting it from the cylinder 199. Such means form per se no part of the present invention.

Thus, as the knuckle joint 195 must turn in a circular arc about the center of the pivot 197, the incidental lost motion is compensated for by the swinging movement of the cylinder 199 about the pivot 200. The link 196 of the link 193, therefore, make up a toggle which, when straightened substantially at the position shown in FIGS. 2 and 3, will exert a maximum of pressure upwardly on the block 189 to cause it to clamp a book tightly against the underside of the abutment means which have been described above.

*Means for forming the staple legs into loops and anchoring the ends thereof in book binding*

Once a book has been suitably clamped in position by the action of the cylinder 199 as hereinabove set out, it is in readiness for the driving of a staple. It is understood, however, that when books are to be bound in accordance with my copending application Serial No. 805,081, filed April 8, 1959, and such as those particularly illustrated in FIG. 42, the book will include a back cover 203, a plurality of sheet 204 and a front cover 205; and these component parts will be arranged with the back cover upwardly or toward the staple to be used as shown in FIG. 42. In accordance with the invention of my copending application, the filler sheets 204 and front cover 205 will be perforated by drilling or otherwise, prior to the assembly of the parts in the relationship shown and in readiness for the stapling operation; while the back cover will be imperforate. Under these circumstances, the front cover is resting upon and clamped by the block 189 which, as aforesaid, serves a dual purpose in that it serves as a clamping means and also is provided with recesses 206 acting as dies, as particularly shown at FIGS. 15 and 16.

As the staple is driven downwardly, the ends of the legs thereof, which are preferably somewhat pointed as aforesaid, pierce through the back cover 203 and are always in frictional relation therewith and thence pass freely through the bores or perforations 207 in the filler sheets and in the front cover, the ends of the staple legs then moving into the die recesses 206 and being curled around substantially as shown in FIG. 16 as the staple is driven downwardly. During this period, the sides of the bores 207 act to confine the staple against undesired buckling and assist in the curling action in that a portion of the staple being driven is in wiping contact with one side of the bore 207 at 208, FIG. 42, and in contact with an edge portion of the bore through the front cover at 209 in addition to its contact with the curved bottom of the recess 206.

When operating in particular accordance with my prior copending application aforesaid, the recesses 206 are arranged to direct the legs of a single staple in a somewhat substantially divergent or helical manner at about 4°–5° to a vertical plane in the embodiment illustrated, which has been found desirable for use in practice. The purposes of this divergence form no necessary part of the present invention, but are set out in greater detail and claimed in the copending application aforesaid. The continued driving of the staple almost to its fully driven position brings the staple to a position with the legs thereof now being formed into almost complete loops and being disposed substantially in the position shown in dotted lines at 210 in FIG. 42.

It has been found that it would not be practically possible without some additional special means, properly to anchor the ends of the loops formed by the legs of the staples into the back cover of a book; so that special means must be and are provided according to this invention, which may be termed "kicker" means for engaging the ends of the wire loops at the dotted line position 210 and forcing them substantially to the full line position shown in that figure.

This means also is preferably responsive to the movement of the principal actuating means 51 in the final portion of their downward (in the present case) staple-driving stroke. For this purpose, a pair of recessed side plates 211, FIGS. 18, 19 and 19a, are provided which are pivoted for limited swinging movement on a stationary pintle at 212, this pintle being suitably anchored in the block 185. The side plates 211 have end portions, at the right as seen in FIGS. 15 and 16, which are secured to a block 213, this block being rigid in use with the side plates 211 and having a portion extending laterally beyond the side member 57 of the unit FIG. 19, so as to be in position to be actuated by a kicker lever 214, which is shown in dotted lines in FIGS. 15 and 18 and in full lines in FIGS. 2, 3 and 4. The kicker lever 214 is pivoted at 215 to the side plate 57 or to some other fixed part of the machine. The kicker lever 214 is actuated upon the final portion of the downward or forward movement of the actuating means 51 by being engaged by a lower flange portion 216, FIGS. 3, 4 and 8 of the rack-carrying bracket 98. Thus, as the bracket 98 carrying the rack 97 is moved downwardly from the position of FIG. 4 to the position of FIG. 3, it will be seen that the lower flange portion 216 thereof will engage and rock the lever 214 in a clockwise direction about its pivot 215. This kicker lever 214 in turn has its opposite end from that engaged by the flange portion 216 in position to engage the block 213 at a point above the pivot 212 thereof, so that clockwise rocking of the lever 214 results in counterclockwise rocking of the block 213 and of the side plates 211 about their pintle 212. As seen in FIGS. 16, 18, 19 and 19a, the forwardly-extending portions of the plates 211 are recessed as shown at 217, so as to receive between them and the adjacent portions of the block 185 the extended and curved ends of the wire legs as they move from the position shown in FIG. 17 to the dotted line position shown in FIG. 42 at 210. When then, the side plates 211 are moved in a counter-clockwise direction, FIGS. 3, 4, 16 and 17 about pintle 212, the shaped recesses 217 will engage the curved upper end portions of the wire legs adjacent to their ends will force these legs from the dotted line to the full line positions shown in FIG. 42 and cause these leg ends again to pierce the back cover 203 of the book adjacent to the junctures between the cross or central portion 158 of the staple, FIG. 41, and the legs thereof, all as shown in FIGS. 41 and 42, thus bringing the staples and the books to the position shown in FIG. 15, which also illustrates the final position for the side plates 211.

It will be noted that in their movement, the side plates 211 are guided in slots provided between the block 185 on the one hand, and the depending portions of the side members 57 and 58 on the other hand.

The book may thereafter be unloaded or released from its clamped position by downward movement of the piston within the cylinder 199 and the consequent lowering movement of the clamping block 189.

While there has been shown and described but one principal embodiment of the present invention in all its phases, other means equivalent to various portions of the means herein particularly described will suggest themselves to those skilled in the art from the foregoing description. I do not wish to be limited, therefore, except by the scope of the appended claims, which are to be construed validly as broadly as the state of the prior art permits.

What is claimed is:

1. A machine for forming and driving staples, comprising means for supplying wires, each of a predetermined length, successively to a given position in which the long dimension of each wire at said position is substantially perpendicular to an edge portion of material to be stapled, and wherein said material has a planiform top surface; means for bending one of said wires to form a staple, including a pair of similar and substantially parallel leg portions and a center portion connecting one end of each of said leg portions; means for rotating said staple through an angle of about 90° about an axis which is parallel to said leg portions and lies therebetween and in the plane thereof to an initial rotated position, means for bodily moving said staple from said initial rotating position to a staple-driving position, wherein said center portion of said staple is substantially parallel to said edge portion of said material to be stapled and said leg portions are substantially perpendicular to the plane of said top surface; and means for driving said staple into said material.

2. A machine for forming and driving staples in accordance with claim 1 in which said axis about which said staple is rotated is midway between said leg portions, so that said staple is located symmetrically with respect to said axis throughout the rotation thereof.

3. A machine for forming and driving staples to serve as the binding and hinges for a plurality of pages to be bound into a book, comprising means for supplying wires, each of a predetermined length, successively to a given position in which the length of each wire at said position is substantially perpendicular to a marginal edge of said pages; means for bending each wire to form a staple, including a pair of similar and substantially parallel leg portions and a center portion connecting one end of each of said leg portions; means for rotating said staple through an angle of about 90° about an axis which is parallel to said leg portions and lies therebetween and in the plane thereof to an initial rotated position, means for bodily moving said staple from said initial rotated position to a staple-driving positions, so as to bring said center portion substantially parallel to said marginal edge of said pages; means acting on said staple at said staple-driving position for driving the staple through said pages; means effective during the driving of said staple and after the leg portions thereof have penetrated through said pages for forming the end parts of said leg portions into loops, which will be disposed in planes substantially perpendicular to said marginal edge and will surround said marginal edge with the extreme ends of the leg portions of said staple disposed substantially in the planes of said loops, said leg portions extending through at least 360° of the loops, so as to form substantially closed loops.

4. A machine for forming and driving staples to serve as the binding and hinges for a book in accordance with claim 3, in which the book to be bound comprises front and back covers and a plurality of filler pages, and in which said back cover is initially imperforate at the point where the staple is to penetrate therethrough while said pages and said front cover are perforated to provide free passage for said staples; in which the legs of the staples are first driven through the back cover so as frictionally to engage with it and then pass freely through preformed perforations in said filler pages and in said front cover; and further comprising means for causing the outer ends of the staples to penetrate a second time through the back cover adjacent to but at an angle with respect to the portions of the legs of the staple contiguous to said center portion and which penetrated through the back cover, so as to lock the staple against rotative movement with respect to the back cover.

5. A machine for forming and driving staples, comprising means for storing a plurality of wires, each of a predetermined length, in parallel side-by-side relation, means for successively feeding individual wires from said storing means to a staple-forming position, means for successively bending each wire at said staple-forming position to form a staple including a pair of similar and substantially parallel length portions and a center portion connecting one end of each of said leg portions, means for rotating each staple thus formed from its staple-forming position to a rotated position in which it is parallel to its staple-driving position, means for bodily moving the staple from its rotated position as aforesaid to a staple-driving position, means cooperating with said staple at the staple-driving position to drive it into material to be bound thereby and for guiding each staple during such driving operation, and operating means for the aforesaid means constructed and arranged to form one staple by bending a wire as aforesaid during the driving of a staple just previously formed at said staple-forming position.

6. A machine for automatically forming and driving staples into material to be stapled, comprising means for storing a plurality of wires, each of a predetermined length, means for actuating said machine through a forward stroke toward the material to be stapled and a return stroke, means operated by said actuating means during a return stroke for feeding a first wire from said storing means to a staple-forming position, means operated by said actuating means during its next forward stroke for bending said first wire at the staple-forming position to form a first staple including a pair of similar and substantially parallel leg portions and a center portion connecting one end of each of said leg portions, means operated by said actuating means on a first portion of its next return stroke to rotate the first staple formed as aforesaid from its staple-forming position to a rotated position parallel with its staple-driving position, means actuated during a subsequent portion of said next return stroke for moving said staple from its rotated position to a staple-driving position during at least a part of the time a second wire is being fed by the means aforesaid from said storing means to said staple-forming position, and means operated by said actuating means on its next succeeding forward stroke to drive the first staple from the driving position thereof into said material substantially simultaneously with the bending of the second wire at said staple-forming position to the form of a second staple.

7. A machine for automatically forming and driving staples into material to be stapled, comprising means for storing a plurality of wires, each of a predetermined length, in a position such that the longitudinal dimension of each wire extends substantially perpendicular to an edge portion of the material to be stapled, means for actuating said machine through a forward stroke toward the material to be stapled and a return stroke, means operated by said actuating means during said return stroke for feeding a first wire lengthwise from said storing means to a staple-forming position, means operated by said actuating means during its next forward stroke for bending the first wire at the staple-forming position to form a first staple, means operated by said actuating means during its next return stroke to rotate said first staple from a position in a plane perpendicular to the edge of the material to be stapled to a plane substantially parallel to the edge to be stapled, means also operating during each said return stroke for thereafter moving said first staple by a bodily translatory movement to a staple-driving position spaced from said staple-forming position, the movement of said first staple from its staple-forming position to said staple-driving position taking place during the feeding of a second wire from said storing means to said staple-forming position by a second operation of said wire feeding means, and means operated by said actuating means on its next succeeding forward stroke to drive the first staple from the staple-driving position thereof into the material substantially simultaneously with the bending of said second wire at said staple-forming position to form a second staple by a second operation of said wire bending means.

8. A machine for forming and driving staples to serve as the binding and hinges for a book, comprising a unit including a means for actuating said machine through a forward stroke toward a book to be bound and a return stroke; said unit further including means for storing a plurality of wires, each of a predetermined length, in a position such that the longitudinal dimension of each wire extends substantially perpendicular to an edge portion of a book in position to be bound, means operated by said actuating means during a return stroke thereof for feeding a first wire lengthwise from said storing means to a staple-forming position, means operated by said actuating means during its next forward stroke for bending said first wire at the staple-forming position to form a first staple, means operated by said actuating means during a first portion of its next return stroke, to rotate said first staple at the staple-forming position from a plane perpendicular to the edge of the book to be bound to a plane substantially parallel to said edge to be bound, and means operated by said actuating means during a subsequent portion of its return stroke for moving said first staple by a bodily translatory movement to a staple-driving position spaced from said staple-forming position, the movement of said first staple from its staple-forming position to said staple-driving position taking place during the feeding of a second wire from said storing means to said staple-forming position by a second operation of said wire feeding means, means operated by said actuating means on its next succeeding forward stroke to drive said first staple from the staple-driving position thereof into said book substantially simultaneously with the bending of said second wire at said staple-forming position to form a second staple by a second operation of said wire bending means, die means in position to cooperate with a book during the driving of a staple therethrough for bending the legs of the staple, as they are extended through and beyond a book to be bound toward a substantially loop form, and kicker means, actuated by the final portion of the forward stroke of said actuating means, for causing end portions of the legs of the staple being driven to be moved forwardly from the substantially loop form aforesaid to positions respectively adjacent to the junctures between the center portion of said staple and the legs thereof, tending to anchor the formed staple against rotation with respect to said back cover during the use of the book.

9. Apparatus for forming similar straight lengths of wire into staples, comprising a substantially cylindrical anvil mounted for free rotation about a substantially vertical axis which is the axis of the cylinder of said anvil, means for successively supplying straight lengths of wire to be formed into staples in a manner such that each length of wire will be supplied to a staple-forming position in which it is disposed substantially horizontally across and is centered with respect to said anvil, a wire holding and bending assembly mounted for movement in a direction substantially axial of said anvil and including a centrally located holding ram and a sleeve concentrically surrounding said ram, means for moving said ram and said sleeve downwardly so that said ram will operate first to hold a wire against said anvil and thereafter said sleeve will move so as to cause portions thereof to engage and bend the outer portions of a wire downwardly about said anvil to form a staple, means for thereafter rotating said anvil, the staple formed therearound and said wire holding and bending assembly as a unit through a predetermined angle about the common axis of said anvil and said assembly, means for thereafter causing said ram and sleeve moving means first to retract said sleeve and then to retract said ram out of contact with the formed staple, and means for then moving the formed staple by a substantially horizontal translatory movement to a predetermined position lateral of said anvil.

10. Apparatus for forming staples in accordance with claim 9, in which the lower end of said holding ram is provided with a transverse groove for engaging the center portion of a wire and for accurately positioning it on said anvil during the forming of a staple; and in which, following the retraction of said assembly from a formed staple and prior to the downward movement thereof for contact with a next succeeding wire to be formed into a staple, said rotating means is effective to rotate said ram and said sleeve back to the initial angular position they occupied, so that said transverse groove will be positioned accurately to engage said next succeeding wire for the forming of a staple therefrom.

11. Apparatus for forming staples in accordance with claim 10, further comprising mechanical means for preventing retractive movement of said assembly from a formed staple prior to the conclusion of the operation of said rotating means and thereafter for preventing the downward movement of said assembly prior to the completion of the reverse rotary movement effected by said rotating means as aforesaid.

12. Apparatus for forming staples in accordance with claim 9, in which said ram is mounted in said sleeve with a compression spring therebetween, so that downward movement of said sleeve will be effective to move both said ram and said sleeve until said ram engages a wire on said anvil, and so that further downward movement of said sleeve for forming a staple results in the compression of said spring, said ram being stationary during such further movement.

13. Apparatus for forming staples in accordance with claim 9, further comprising guide means for maintaining the end portions of a wire always in a substantially vertical plane containing the axis of said anvil during the bending of said wire to the form of a staple.

14. Apparatus for forming staples in accordance with claim 9, further comprising a slot formed by parts of said apparatus defining a path in a vertical plane containing the axis of said anvil for maintaining the forward portion of a wire at said staple-forming position in said plane during the staple forming operation, and a stationarily located resilient means for positioning and guiding a wire during the movement thereof to said staple-forming position and further for guiding a rear portion of a wire in said plane during the staple forming operation.

15. Apparatus for forming similar straight lengths of wire into staples, comprising a substantial cylindrical anvil mounted for free rotation about a substantial vertical axis which is the axis of the cylinder of said anvil, means for successively supplying straight lengths of wire to be formed into staples in a manner such that each length of wire will be supplied to a staple forming position in which it is disposed substantially horizontal across and is centered with respect to said anvil, vertically reciprocating actuating means, a block carried by said actuating means, a sleeve slidingly received in said block and carrying therein a holding ram, a pin and helical slot connection between said sleeve and said block, means on said sleeve for limiting the sliding movement of said block with respect thereto in a direction axial of said sleeve, said limiting means and said pin and helical slot connection serving to rotate said sleeve with respect to said block through a predetermined angle during the relative movement therebetween in which said block is moved from one end of its path of travel to the other with respect to said sleeve, resilient means interposed between said sleeve and said ram, and wire bending means at the lower end of said sleeve; the aforesaid parts acting upon downward movement of said actuating means from its uppermost position, to move said block first with respect to said sleeve so as to rotate said sleeve through said predetermined angle to a selected angular position with respect to said block, then to move said block, said sleeve and said ram downwardly, with said ram first to engage a wire at said staple forming position, and thereafter to move said sleeve with respect to said ram against said resilient means so as to bend the end portions of said wire to the form of a staple; and on upward movement of said actuating means and said block from their lowermost positions, said block in moving from its lowermost to its uppermost position with respect to said sleeve, acting first to rotate said sleeve, said ram, said anvil and the formed staple gripped therebetween through said predetermined angle, and thereafter to move said sleeve upwardly, and then to move said ram upwardly until both are out of contact with the formed staple.

16. Apparatus for formed staples in accordance with claim 15, in which means are provided to prevent relative rotation of said ram and said sleeve about the common axis thereof and in which the lower end of said holding ram is provided with a transverse groove for engaging the center portion of a wire at said staple forming position and for accurately positioning it on said anvil during the forming of a staple.

17. Apparatus for forming staples in accordance with claim 15, further comprising a toggle linkage including a pair of articulated links connected in series between said sleeve and a fixed portion of said apparatus and arranged to be at a dead center position at a lowermost end of the path of movement of said sleeve, said toggle linkage being effected mechanically to prevent upward movement of said sleeve from its lowermost position until said pin and helical slot connection between said sleeve and said block is effective incident to the upward movement of said block to rotate said sleeve, and also said ram, said anvil and the formed staple therebetween through said predetermined angle prior to upward movement of said sleeve, and cam means actuated by upward movement of said actuating means for breaking said toggle to permit upward movement of said sleeve and of said ram away from a formed staple.

18. Apparatus for forming staples in accordance with claim 15, further comprising a toggle linkage including a pair of articulated links connected in series between said sleeve and a fixed portion of said apparatus and arranged to be in a dead center position at the uppermost end of the movement of said sleeve and of said block, said toggle linkage serving at a dead center position mechanically to prevent downward movement of said sleeve upon the downward movement of said block with respect to said sleeve throughout substantially the entire permitted relative movement of those two parts, so that said sleeve will first be rotated incident to said pin and helical slot connection between it and said block, and means moving with said actuating means and said block for breaking said toggle following the rotation of said sleeve so as to permit the simultaneous downward movement of said block, said sleeve and said ram.

19. Apparatus for forming staples in accordance with claim 15, further comprising a toggle linkage including a pair of articulated links connected in series between said sleeve and a fixed portion of said apparatus and arranged to be in an extended dead center position at the uppermost position of said sleeve and in a folded dead center position at the lowermost position thereof, so as to prevent movement of said sleeve away from each of its extreme positions until the rotation of said sleeve by movement of said block and by said pin and helical slot connection therebetween has been substantially completed, and cam means moved by said actuating means for moving said toggle linkage off each of said dead center positions aforesaid.

20. Apparatus for forming staples in accordance with claim 19, in which said resilient means extending between said ram and said sleeve comprises a compression spring tending to move said ram downwardly with respect to said sleeve; said apparatus further comprising a spring tending to oppose movement of said toggle linkage away from the dead center position it occupies when said sleeve is at its lowermost position and controlling the movement of said toggle linkage during at least the first portion of the upward movement of said sleeve and while said ram is maintained in contact with a formed staple incident to the expansion of said compression spring between said sleeve and said ram, so that said compression spring will be ineffective to move said sleeve upwardly at a rate faster than the upward movement of said block, and so that there will be no relative rotation between said sleeve and said block following the initial breaking of the toggle and during the continued upward movement of said block.

21. Apparatus for forming similar straight lengths of wire into staples, comprising a substantially cylindrical anvil mounted for free rotation about a substantially vertical axis which is the axis of the cylinder of said anvil, means for successively supplying straight lengths of wire to be formed into staples in a manner such that each length of wire will be supplied to a staple forming position in which it is disposed substantially horizontally across and is centered with respect to said anvil, a wire holding and bending assembly mounted for movement in a direction substantially axial of said anvil for holding a central portion of a wire on said anvil and for bending the end portions of this wire down around said anvil to form a pair of substantially parallel legs of a staple, means effective after the forming of the staple as aforesaid for rotating said wire holding and bending assembly, said anvil and said staple as a unit through a predetermined angle about the common axis of said anvil and said assembly, stationary wall means disposed in vertical planes and spaced laterally from said anvil by an amount sufficient to permit the passage of the legs of a staple therebetween, while being in frictional contact with said legs so as to steady the staple in a position with its legs between said anvil and said wall means, so as to prevent inadvertent movement of said staple by the frictional contact thereof with said wall means, and a pair of blade members mounted for simultaneous movement and arranged simultaneously to engage both legs of the staple to move the staple to a position laterally of and out of contact with said anvil in a direction substantially parallel to the planes of said wall means.

22. Apparatus for forming staples in accordance with claim 21, in which the angle through which a staple is rotated following the forming of a wire into staple form is about 90°, and in which said pair of blade members are moved during the supplying of the next succeeding length of wire to said staple forming position, and further comprising means for moving said blades actuated by said wire supplying means.

23. Apparatus for forming and driving staples in accordance with claim 22, in which said blades move a formed staple from its rotated position on said anvil to a staple driving position, and further comprising forward guide means at said staple driving position against which said staple is moved by said blades, and means for maintaining said blades in position to serve as rear guides for a staple during at least a part of the driving thereof, so as to prevent buckling of the leg portions of the staple during a substantial portion of the staple driving operation.

24. Apparatus for forming and driving staples in accordance with claim 23, in which said means for moving said blades to move a staple to its staple driving position comprises toggle means including a pair of articulated links connected in series between said blades on the one hand and a fixed part of said apparatus on the other, and cam means carried by said wire supplying means for moving said articulated links of said toggle so as to hold said links in a dead center position when said blades have moved a staple to the staple driving position thereof, and other cam means carried by said wire supplying means and effective to break the toggle and retract said blades during a later portion of the staple driving operation.

25. Apparatus for forming similar straight lengths of wire into staples, comprising a substantially cylindrical anvil mounted for free rotation about a substantially vertical axis which is the axis of the cylinder of said anvil, means for successively supplying straight lengths of wire to be formed into staples in a manner such that each length of wire will be supplied to a staple-forming position in which it is disposed horizontally across and centered with respect to said anvil, a wire-holding and bending assembly mounted for movement in a direction substantially axial of said anvil and including a centrally located holding ram and a sleeve concentrically surrounding said ram, the lower ends of said ram and of said sleeve each being formed with a pair of spaced, diametrically opposed downwardly extending projections, ram and sleeve-moving means for moving said ram downwardly to bring the projections thereof into engagement with a wire at said staple-forming position for holding it against said anvil and thereafter for moving said sleeve downwardly with respect to said ram, so that the projections of said sleeve will bend the end portions of a wire about said anvil to form a staple, means for thereafter simultaneously rotating said anvil, the formed staple thereon and said wire-holding and bending assembly as a unit through an angle of substantially 90° about the common axis of said anvil and said assembly, means for then causing said sleeve and ram-moving means first to retract said sleeve out of contact with the formed staple and thereafter to retract said ram out of contact therewith, means for then moving the formed staple by a substantially horizontal translatory movement to a predetermined position lateral of said anvil, and means for coordinating the timing of the ram and sleeve-moving means so that said sleeve is retracted at least to the position such that the juncture of the projections thereof with the remainder of said sleeve is above the level of the cross portion of said formed staple on said anvil at the time the leading end of a next succeeding wire is being projected across said anvil toward its staple-forming position so that said next wire may pass between the projections of said sleeve and of said ram, said means for supplying straight lengths of wire serving to supply such lengths at a level slightly above that occupied by a wire in contact with said anvil, so that the formed staple will not interfere with the supplying of the next succeeding wire to said staple-forming position.

26. Apparatus for forming staples in accordance with claim 25, further comprising a groove formed as two aligned groove portions in the ends of said projections from said ram and arranged to engage a wire at said staple-forming position first to move this wire downwardly into contact with said anvil and then to hold it against said anvil during the forming of a staple therefrom and during the rotation of said staple through a 90° angle along with said ram and said anvil, and resilient guide means associated with said means for supplying straight lengths of wire for holding a length of wire being projected endwise toward said staple-forming position at a level slightly above that of a wire resting across and in contact with said anvil, said guide means further serving during the staple-forming operation to steady and guide a rear portion of the wire to maintain it in a vertical plane containing the axis of said anvil during the bending thereof to the form of a staple.

27. Apparatus for binding books by driving through a binding edge portion thereof at least one staple having long legs and forming the legs of the staple into loops about which the book pages may turn during use, said apparatus comprising a staple-driving blade movable in a predetermined path, means to move formed staples successively to a staple-driving position in alignment with said blade, means for clamping the pages of a book to be bound at a predetermined position with respect to said path, means for driving said blade to drive a staple from said staple driving position through the pages to be bound, die means including curved bottom die recesses for receiving each leg of a staple respectively after the legs have penetrated through a book and for turning the staple legs into loop-like form, said die recesses being so shaped and directed as to give divergent directions to the legs of a staple, so that each is formed into a substantially helical part loop with the helix of one leg having a right-hand pitch and that of the other a left-hand pitch, and other wire-receiving and guiding means cooperating with an end portion of each of the legs of the staple during their formation into part loops as aforesaid for directing the wire ends back toward the points where the staple legs first penetrated into the book being bound.

28. Means for binding books in accordance with claim 27, in which said other wire-receiving and guiding means is mounted for limited movement with respect to stationary parts of said apparatus, and further comprising means for moving this wire-receiving and guiding means as a kicker means at a time during the final portion of movement of said staple-driving blade, so as to cause the legs of a staple to be bent toward points where the legs first penetrated a book respectively, and so as to form the staple legs into substantially completed loops.

29. Apparatus for binding books by driving through a binding edge portion thereof at least one staple having long legs and forming the legs of the staple into loops about which the book pages may turn during use, said apparatus comprising a staple-driving blade movable in a predetermined path, means to move formed staples successively to a staple-driving position in alignment with said blade, means for clamping the pages of a book to be bound at a predetermined position with respect to said path, means for driving said blade to drive a staple from said staple-driving position through the pages to be bound, die means including curved bottom die recesses for receiving each leg of a staple respectively after the legs have penetrated through a book and for turning the staple legs into loop-like form, and other wire-receiving and guiding means mounted for limited movement and acting as a kicker means to cooperate with an end portion of each of the legs of the staple during their formation into part loops as aforesaid for directing the wire ends back toward the respective points where the staple legs first penetrated into the book to be bound, and means for moving said wire-receiving and guiding means during a final portion of the movement of said staple-driving blade so as to cause the legs of a staple again to penetrate a portion of the book at points respectively adjacent to the points where said legs of the staple first penetrated through this portion of the book, so as to anchor the completely driven staple with respect to said portion of the book against relative movement therebetween, while permitting other portions, including the pages of the book to be movable about the loops formed from the staple legs.

30. Means for binding books in accordance with claim 29, wherein the books to be bound consist of relatively heavy front and back covers and a plurality of relatively thinner pages therebetween, in which said back cover is initially imperforate, while the front cover and intermediate pages are perforated prior to driving a staple therethrough in alignment with the path of the legs of the staple, so that when driven the staple will penetrate through the initially imperforate back cover and will pass freely through the perforations in the intermediate pages and the front cover of the book; said other wire-receiving and guiding means acting to cause the ends of these staple legs to penetrate through the back cover a second time at points adjacent to the points where said legs initially penetrated through said back cover and at a substantial angle to the portions initially penetrating therethrough, so as to anchor the staple with respect to the back cover of the book.

31. Means for binding books in accordance with claim 30, further comprising actuating means for said driving blade movable in a straight reciprocatory path, and means movable with said actuating means for transmitting motion to said wire-receiving and guiding means only during the last end portion of the movement of said driving blade in driving a staple.

References Cited in the file of this patent

UNITED STATES PATENTS

| | | |
|---|---|---|
| 1,293,153 | Mandzuk | Feb. 4, 1919 |
| 1,650,278 | Kingsbury | Nov. 22, 1927 |
| 1,994,255 | Rosenmund | Mar. 12, 1935 |
| 2,141,612 | Maynard | Dec. 27, 1938 |
| 2,365,429 | Muske | Dec. 19, 1944 |
| 2,377,340 | Grinnell | June 5, 1945 |